United States Patent [19]

Weinstein et al.

[11] 3,946,357

[45] Mar. 23, 1976

[54] METHOD AND APPARATUS FOR SEISMIC GEOPHYSICAL EXPLORATION

[75] Inventors: David Harold Weinstein, Brookshire; Monroe Alfred Ashworth, III; A. J. Mallett, both of Houston, all of Tex.

[73] Assignee: The Superior Oil Company, Houston, Tex.

[22] Filed: Dec. 23, 1974

[21] Appl. No.: 536,965

[52] U.S. Cl.. 340/15.5 TS; 340/15.5 CP; 340/16 C; 325/113
[51] Int. Cl.[2]....................... G01V 1/22; H04B 7/14
[58] Field of Search 340/15.5 CP, 15.5 TC, 15.5 TS, 340/16 C, 174 B, 174 G, 150, 151; 325/28, 113; 346/33 C; 250/265

[56] References Cited
UNITED STATES PATENTS

| | | | |
|---|---|---|---|
| 3,288,242 | 11/1966 | Loeb | 340/15.5 TS |
| 3,739,870 | 6/1973 | Pelton et al. | 340/15.5 TS |
| 3,806,864 | 4/1974 | Broding et al. | 346/33 C |
| 3,886,494 | 5/1975 | Kostelnicek et al. | 325/113 |

*Primary Examiner*—T. H. Tubbesing
*Assistant Examiner*—N. Moskowitz
*Attorney, Agent, or Firm*—Vinson, Elkins, Searls, Connally & Smith

[57] ABSTRACT

A method and apparatus for seismic geophysical exploration including a seismic energy source, a control means, a plurality of geophones, and a plurality of geophone monitoring means, all located in a selected survey area. Each geophone monitoring means is positioned in relatively close physical proximity and electrically coupled to one or more of the geophones forming a set of geophones. The control means is utilized to generate electrical signals containing data initiating the operation of the seismic energy source and the plurality of geophone monitoring means. The electrical signals generated by the various geophones in a set responsive to a particular shot of the seismic energy source are received by the associated geophone monitoring means. Apparatus contained within the associated geophone monitoring means samples such geophone signals and produces representative data in digital form. The digitized data is stored in a memory device contained within the geophone monitoring means. When the geophone monitoring means receives electrical signals from the geophones responsive to a subsequent shot of a seismic energy source, these electrical signals are sampled and digitized. The stored data from the previous shot is withdrawn from the memory device and the data representative of the subsequent shot is summed thereto. The summed data is then accessed to the memory device. The procedure is repeated successively until the data representative of a selected number of shots has been summed. The cumulatively summed data is then accessed to a recording device also contained within the geophone monitoring means and a record is made of such summed data.

23 Claims, 20 Drawing Figures

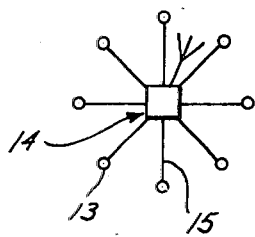
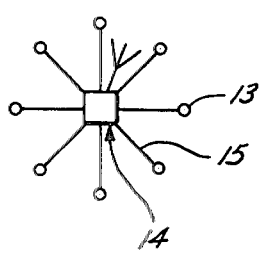
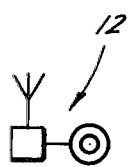
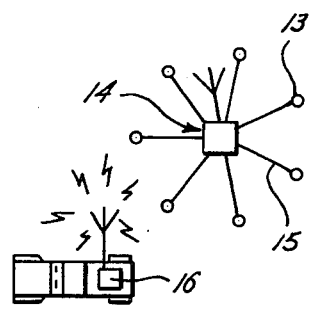
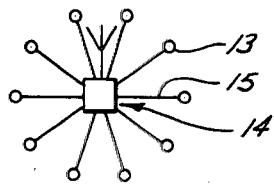
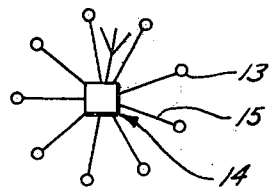
Fig. 1

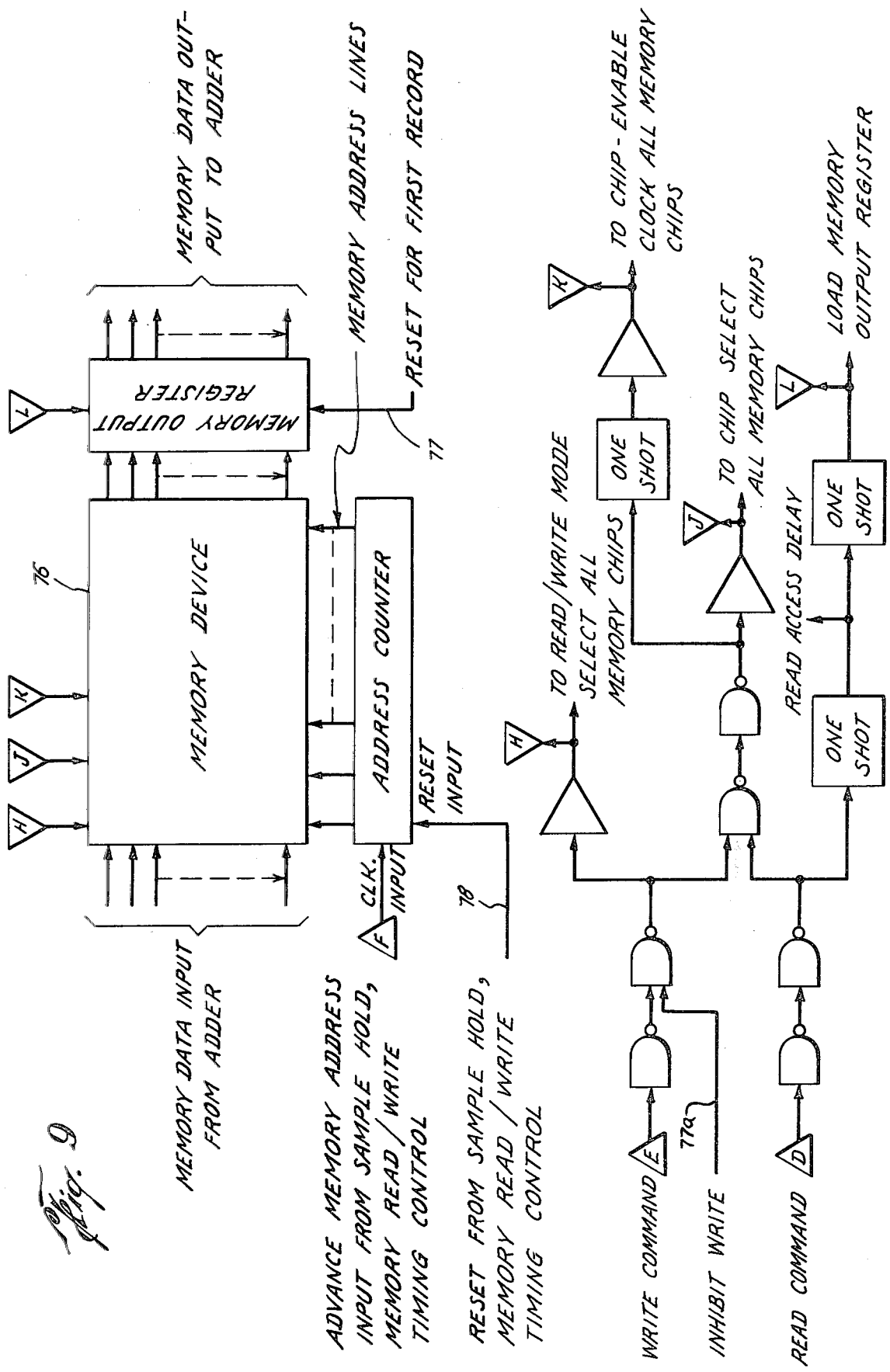

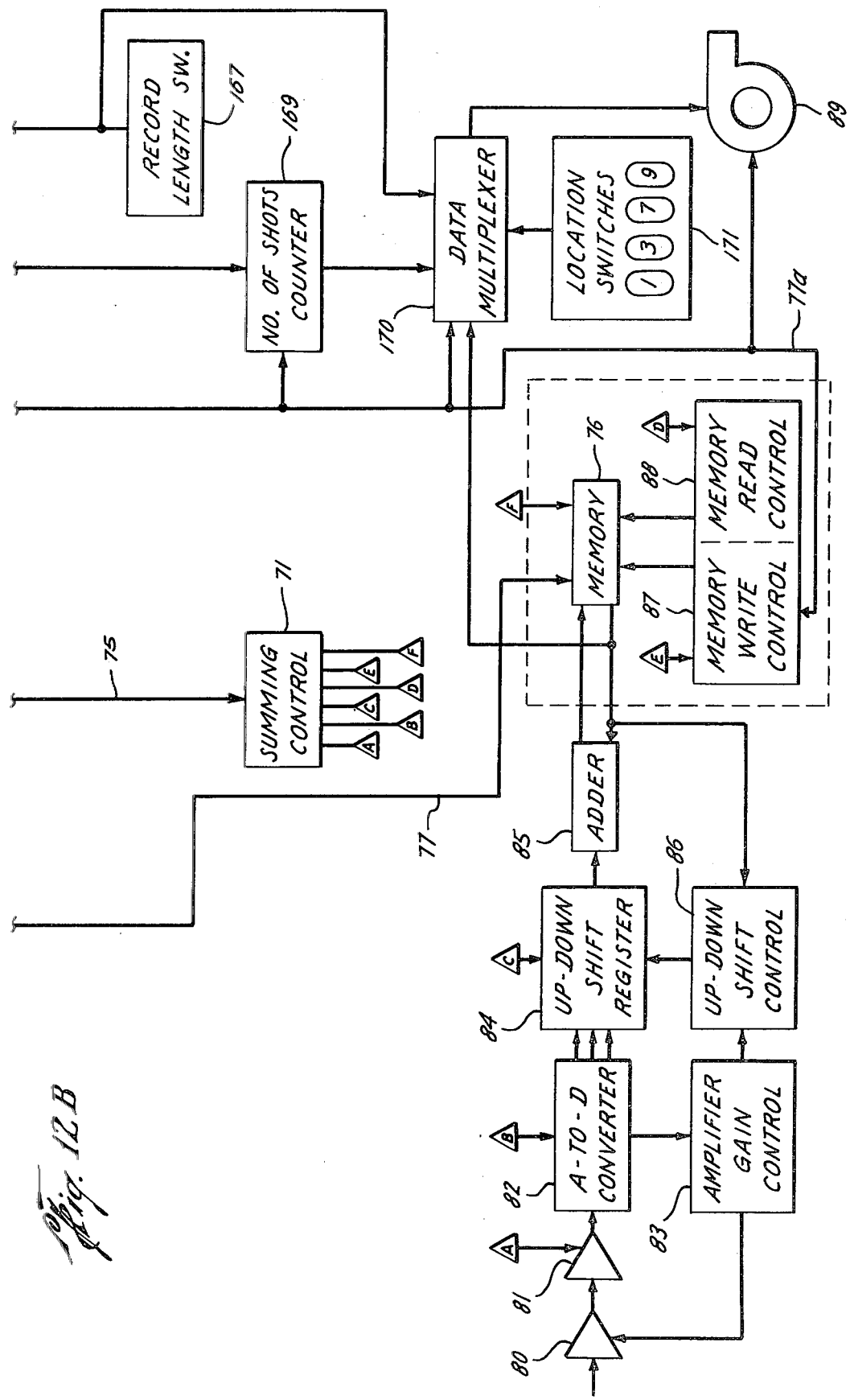

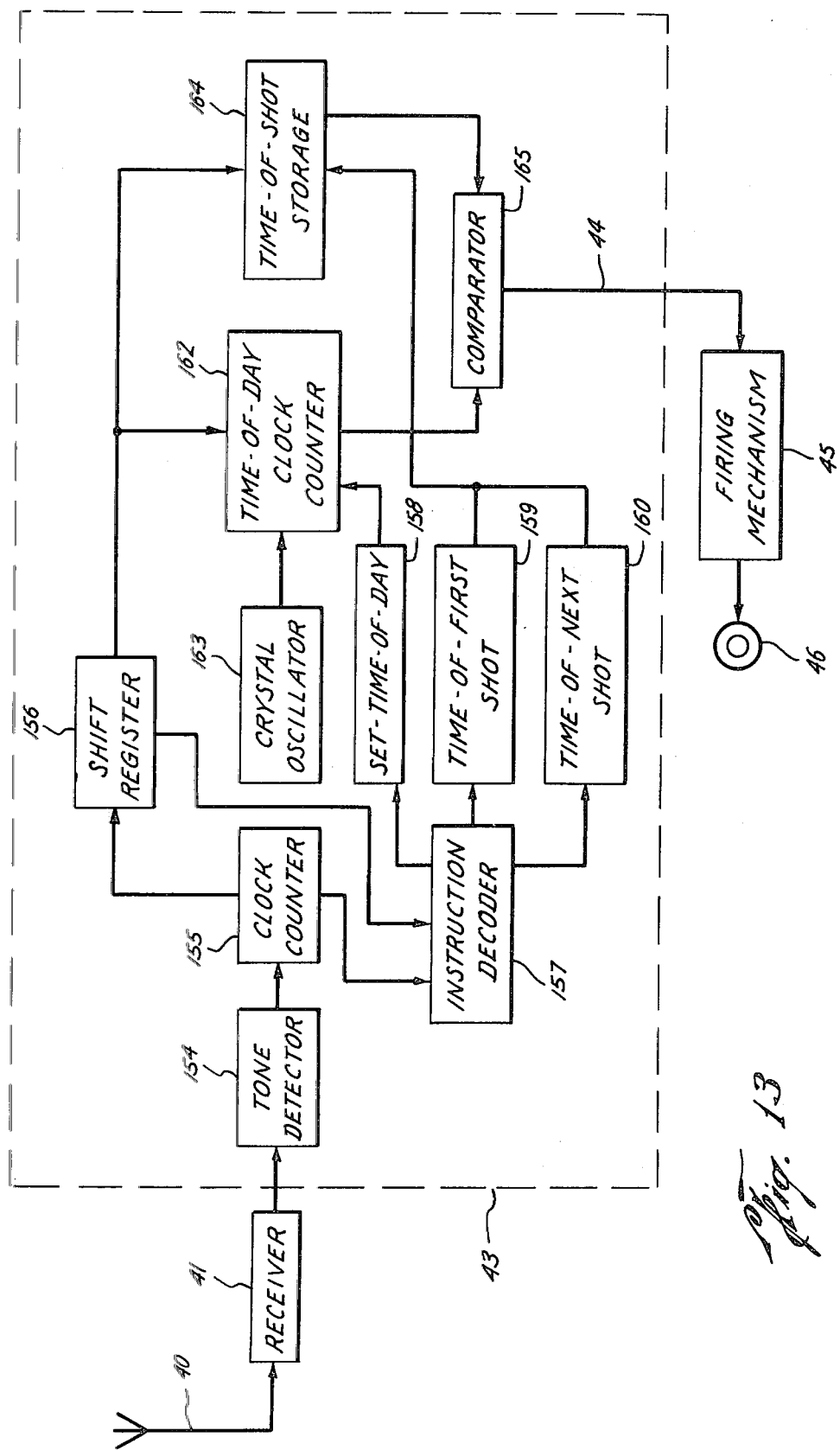

METHOD AND APPARATUS FOR SEISMIC GEOPHYSICAL EXPLORATION

BACKGROUND OF THE INVENTION

The seismic method of delineating geological subsurfaces of the earth involves the use of a source of seismic energy and its reception by an array of seismic detectors, generally referred to as geophones. When used on land, the source of seismic energy generally is a high explosive charge electrically detonated in a borehole located at a selected grid point in the terrain. The acoustic waves generated in the earth by the explosion are reflected back from pronounced strata boundaries and reach the surface of the earth after varying intervals of time, depending on the distance and the nature of the subsurface traversed. These returning acoustic waves are detected by the geophones, which function to transduce such acoustic waves into representative electrical signals. The plurality of geophones are arrayed in a selected manner to detect most effectively the returning acoustic waves and generate electrical signals representative thereof from which data may be deduced concerning the geological subsurface of the earth.

Seismic geophysical exploration has been modified in recent years by some seemingly small, but significant changes. One such change relates to the signal enhancement produced by the common depth point method as illustrated in the United States letters Patent 2,732,906 to Mayne. As a result of this improvement, it has become possible to utilize sources of seismic energy which are much weaker than explosives, but which are frequently much more practical and convenient. However, in practice, the common depth point method requires very large arrays of geophones, and these weaker seismic energy sources often require the summing or vertical stacking of detected responses to a large number of individual "shots" by the same or different seismic energy sources.

It is common today in the art to utilize at least twenty-four separate groups of geophones arrayed over a distance of some two or three miles. In many seismic systems utilized today in the art, the geophones in the array are electrically connected to a central recording apparatus by means of a long multi-conductor or coaxial cable, and the electrical signals generated by the geophones are coupled through the cable to the central recording apparatus.

There are numerous problems involved in the use of long cables to bring the signals from the geophones to the central recording station: resistivity losses can be quite high; the lines tend to pick up extraneous electrical noises; the cables tend to dictate that the arrays of geophones be linear; the geophone intervals are fixed by the construction of the cables; laying out the cable itself may be a major undertaking, such as in jungles, swamp or marsh; the cables are subject to attack by animals as well as humans; the cables are subject to water infiltration and mechanical damage; the cables are expensive and require repairs, upkeep and spare parts in remote areas; the central recording apparatus tends to be bulky; and multiplexing problems associated with digital recording arise when numerous geophone groups are utilized.

There have been attempts to develop improved seismic geophysical exploration systems which, among other things, eliminate the long cables. Examples of such systems are the systems disclosed in United States letters Patent Nos. 2,749,772; 3,283,296; and 3,806,864. However, for one reason or another, each of the above prior art systems is disadvantageous. By way of example, in the prior art systems which eliminate the use of long cables, there is no means for the data produced by the geophones responsive to a particular shot of the seismic energy source to be summed or stacked by the remote monitoring units with the data produced by the geophones responsive to other shots of the seismic energy source. In addition, these prior art systems which eliminate the use of long cables require superior radio communication between the control unit and the remote monitoring units. Under noisy conditions, the time of the shot by the seismic energy source may be uncertain and thus lead to degradation of the seismic data.

SUMMARY AND OBJECTS OF THE INVENTION

This invention provides an improved method and apparatus for seismic geophysical exploration which is more advantageous and practical than the prior art systems. The improved seismic geophysical exploration system according to this invention includes a seismic energy source for generating acoustic waves through the earth and a plurality of geophone monitoring means each of which is positioned in relatively close physical proximity to one or more geophones forming a set of geophones. Each of the geophones in a set is coupled, such as by a short conductor, to the associated geophone monitoring means so that electrical signals generated by the geophones can be communicated between the geophones in the set and the associated geophone monitoring means.

A control means is utilized by the operator of the system to initiate the operation of the seismic energy source and the plurality of geophone monitoring means. In a first embodiment of the method and apparatus for seismic geophysical exploration according to this invention, the control means is utilized by the operator of the system to generate electrical signals carrying data commanding the seismic energy source to immediately produce a shot and/or commanding certain immediate operations of the geophone monitoring means. In this first embodiment of the method and apparatus according to the invention, the data carried by the electrical signals includes a realtime "time break" signal which initiates immediately the commanded operations of the other components of the system. In this first embodiment of the invention, the control data contained in the electrical signals may be transmitted to the seismic energy source and the remote geophone monitoring means by transmitting the electrical signals through cables or transducing the electrical signals into electromagnetic signals and broadcasting such electromagnetic signals. In a second embodiment of the method and apparatus for seismic geophysical exploration according to this invention, the control means is utilized by the operator of the system to generate and transmit electromagnetic signals carrying data synchronizing a clocking means in the seismic energy source and a clocking means in each of the various geophone monitoring means, and thereafter to generate and transmit electromagnetic signals carrying data commanding the seismic energy source to produce a shot at a selected future instant of time and/or commanding the various geophone monitoring means to perform certain operations at selected future instants of time. In this second embodiment of the method and apparatus according to the invention, instead of the electromagnetic signals including time break data, the electromagnetic signals contain data instructing the various components of the system to commence performing the desired operations at selected future instants of time. The remote components include apparatus for examining the message carried by the electromagnetic signals to determine if the message was correctly received. Since the commanded operations of the remote components are not to be performed until a selected future instant of time, there is sufficient time for the message to be transmitted repetitively thereby greatly enhancing the probability the message, including the time of the shot, is correctly received. In still another embodiment of the improved method and apparatus for seismic geophysical exploration according to this invention, the control means is utilized by the operator of the system to generate and transmit electrical signals carrying data synchronizing a clocking means in the seismic energy source and a clocking means in each of the various geophone monitoring means, and thereafter the seismic energy source and the various geophone monitoring means operate according to preselected internal programs. The third embodiment of the method and apparatus according to the invention can be effectively utilized in situations in which radio communication is impractical.

Each geophone monitoring means includes a memory means for storing the complete seismic data produced by the associated geophones in response to one "shot" by a seismic energy source. Each geophone monitoring means also includes means for withdrawing the stored seismic data from the memory means and summing or adding thereto the complete seismic data produced by the geophones in response to a subsequent shot, and then again accessing the summed seismic data into the memory device. This process continues until the data from a selected number of shots has been summed or vertically stacked within the geophone monitoring means. After the selected number of shots has occurred, the summed data is transferred from the memory means to a recording means within the geophone monitoring means.

Each geophone monitoring means contains an internal clocking apparatus which, upon being initiated by an electrical signal generated by the control means, produces the necessary clocking signals for the internal operation of the geophone monitoring means. This eliminates the necessity for the control means to generate an electromagnetic signal providing a continuous, accurate, clocking signal.

It is an object of this invention to provide an improved seismic geophysical exploration system in which the long cables between the various geophones and a central recording unit may be eliminated, thereby reducing resistive losses of signals, extraneous electrical noises, bulky central recording apparatus, digital data sampling restrictions and labor costs.

It is an object of this invention to provide an improved seismic geophysical exploration system in which a geophone monitoring means is associated with one or more geophones in the field for receiving, storing, summing and recording the seismic data produced by the geophones in response to several shots, thereby producing a stacking within the geophone monitoring means of the seismic data produced by the shots.

It is an object of this invention to provide an improved seismic geophysical exploration system in which a geophone monitoring means is associated with one or more geophones in the field for receiving, storing, summing and recording the seismic data produced by the geophones in response to several shots, which geophone monitoring means includes an internal clocking apparatus for producing clocking signals for the operation of the geophone monitoring means.

It is an object of this invention to provide an improved seismic geophysical exploration system in which a geophone monitoring means is associated with one or more geophone in the field for receiving, storing, summing and recording the seismic data produced by the geophones in response to several shots, and in which a control means is employed for generating electrical signals initiating the seismic energy means and the various geophone monitoring means.

It is an object of this invention to provide an improved seismic geophysical exploration system in which the need for long cables between the various geophones and a central recording unit is eliminated, in which a geophone monitoring means is associated with one or more geophones in the field for receiving and recording the seismic data produced by the geophones responsive to a shot from the seismic energy source, and in which a control means is employed for generating and transmitting electromagnetic signals commanding the seismic energy source and/or the geophone monitoring means to commence performing a preselected operation at a selected future instant of time, whereby the electromagnetic signal can be transmitted repetitively to enhance the probability that the message being transmitted by the electromagnetic signal is received correctly by the seismic energy source and the various geophone monitoring means.

It is an object of this invention to provide an improved seismic geophysical exploration system in which the long cables between the various geophones and a central recording unit are eliminated, in which a geophone monitoring means is associated with one or more geophones in the field for receiving and recording the seismic data produced by the geophones responsive to a shot from the seismic energy source, and in which the seismic energy source produces its shot and the various geophone monitoring means commence receiving and recording data at a selected future instant of time in accordance with internal preselected programs and synchronized clocking means contained within the seismic energy source and the various geophone monitoring means.

This invention possesses many other advantages and has other objects which may be more clearly apparent from the consideration of the forms in which it may be embodied. Three embodiments of the invention are shown in the drawings accompanying and forming part of the present specification. These embodiments of the invention will now be described in detail for the purpose of illustrating the general principles of the invention.

BRIEF DESCRIPTION OF THE DRAWINGS

Referring to the drawings in which like numerals represent like parts:

FIG. 1 illustrates schematically a possible physical arrangement of the components of a preferred seismic geophysical exploration system according to this invention.

FIG. 9 is a partial schematic and partial block diagram of the preferred components of the memory means, the memory write control and the memory read control of the geophone monitoring means illustrated in FIG. 6.

FIGS. 12A and 12B are a partial schematic and partial block diagram of the electrical components of a preferred geophone monitoring means in the second embodiment of the seismic geophysical exploration system according to this invention.

FIG. 13 is a block diagram of the electrical components of the preferred seismic energy source in this second embodiment of this invention.

DESCRIPTION OF PREFERRED EMBODIMENTS OF INVENTION

Figure 2:
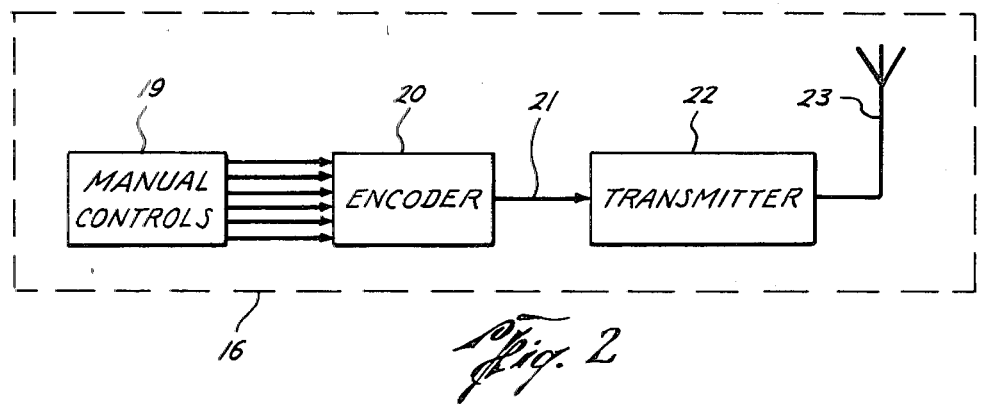
FIG. 2 is a block diagram of the electrical components of a preferred control means in a first embodiment of the seismic geophysical exploration system according to this invention.

FIG. 1 illustrates schematically a possible physical arrangement of the components of a preferred seismic geophysical exploration system according to this invention.

A seismic energy source 12 is employed for generating seismic waves in the earth. In this description of the invention, it is often stated that the seismic energy source produces a shot which generates seismic waves. The terms "produces a shot" or "shot" refer to one operation of the seismic energy source 12 to generate acoustic or seismic waves in the earth, whether such seismic waves are generated rapidly such as by an explosive or over a relatively long time duration such as by the VIBROSEIS method.

A plurality of geophones 13 are positioned in selected locations in a survey area in physical communication with the earth. Each geophone 13 functions to receive the seismic waves after travel through the earth and to transduce such received seismic waves into representative electrical signals. As shown in FIG. 1, the geophones are arrayed in a two dimensional formation in the survey area: five circular formations spaced apart from each other. The geophones forming each circular formation comprise a set of geophones. Positioned in relatively close proximity to each set of geophones and electrically coupled thereto, is a geophone monitoring means 14. While each geophone monitoring means 14 is illustrated electrically coupled to seven, eight, nine or ten geophones, it is contemplated that each individual geophone monitoring means 14 could be electrically coupled to a single geophone 13. In other words, the geophones 13 and the geophone monitoring means 14 could be electrically coupled to each other in a one-to-one relationship. Coupling means 15 connect each of the geophones in a set with the geophone monitoring means 14 for that set and function to communicate the electrical signals generated by the geophones from the individual geophones to the associated geophone monitoring means. The coupling means 15 preferably are small electrical conductors; since the conductors are short in length, they do not present the same difficulties as the long cables used by the prior art systems to communicate between the geophones and the recording apparatus.

Each geophone monitoring means 14 functions to receive the various electrical signals generated by the associated geophones responsive to a shot by the seismic energy source, to transduce such electrical signals into data representative thereof and to store such data in a memory means within the geophone monitoring means, to receive the electrical signals generated by the associated geophones responsive to a subsequent shot and transduce such electrical signals into representative data, to withdraw the stored data from the memory means and sum or add thereto the data representative of the subsequent shot and then again access the summed data into the memory means, and to repeat this process for a selected number of shots and then transfer the summed data from the memory means onto a recording means within the geophone monitoring means, which recording means makes a record of the summed data.

The operator of the system utilizes a control means 16 to initiate the operation of the various components of the system via electrical signals. There are described herein three embodiments of a seismic geophysical exploration system according to this invention, each embodiment having a different method and apparatus for the control means 16 to initiate the operation of the various components of the system.

The various preferred components of the improved seismic system according to this invention will now be described in detail.

A. Embodiment in which the control means generates an electrical signal containing data commanding the seismic energy means and/or the various geophone monitoring means to perform immediately a preselected operation.

In the first embodiment of the improved method and apparatus for seismic geophysical exploration according to this invention, the control means 16 functions to generate electrical signals containing data commanding the seismic energy source and/or the various geophone monitoring means to commence performing immediately certain preselected operations. For example, the electrical signal may contain coded data representative of a command for the seismic energy source to immediately produce a shot and of a command for a desired preselected operation to be performed immediately by the various geophone monitoring means with respect to the electrical signals generated by the geophones responsive to the shot. Or, the electrical signal may contain data representative of a command for the various geophone monitoring means to immediately perform some operation on the data it has already gathered from the geophones. In this first embodiment of the seismic system, the electrical signal generated by the control means 16 includes coded data representative of a "time break," that is, an impulse which initiates immediately the preselected operation of the seismic energy source and/or the various geophone monitoring means.

In the first embodiment of the invention, the data contained in the electrical signal generated by the control means may be transmitted to the seismic energy source and the remote geophone monitoring means by long cables. However, it is preferable that such electrical signals are transduced into electromagnetic signals and transmitted to the remote units through the atmosphere. As illustrated in FIG. 2, the control means 16 in this first embodiment of the invention preferably includes manual control 19 for allowing the operator of the system to input to the control means selected commands and data which will be transmitted by electromagnetic signals to the various geophone monitoring means 14 and the seismic energy source 12. The manual controls 19 may be any of numerous commercially available apparatus, each as a EECO Switch No. 197606G. This particular EECO switch is coded for binary coded decimal output. Logic levels, either a "high" or a "low," presented at the output lines of the switch are utilized to represent decimal numbers in a selected range, such as, the range zero to nine. The outputs of the manual controls 19 preferably are coupled to the input of an encoder 20 which functions to transduce the representative logic level signals received from the output lines of the manual controls 19 into a serial stream of audible tones having frequency $f_1$ or $f_2$.

The output of the encoder preferably is coupled over line 21 to the input of a transmitter 22 such as a General Electric LB1-3546P, which functions to generate an electromagnetic signal, such as a frequency modulated radio signal, representative of the serial stream of audible tones $f_1$ or $f_2$ generated by the encoder 20. The output of the transmitter 22 is coupled to an antenna 23 which broadcasts the electromagnetic signals into the air.

Figure 3:
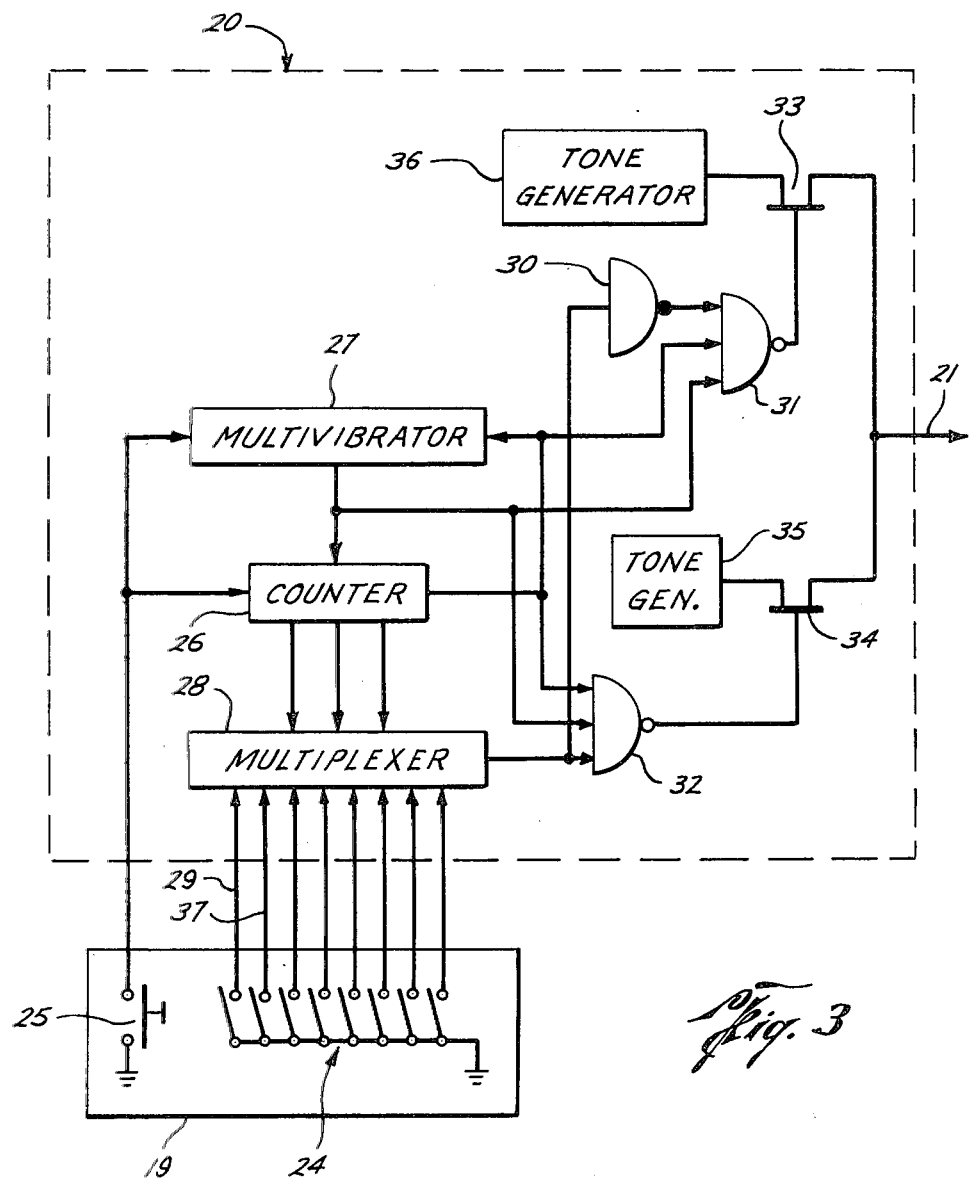
FIG. 3 is a partial schematic and partial block diagram of the preferred components of the encoder in the control means illustrated in FIG. 2.

FIG. 3 illustrates a preferred encoder 20 to be utilized in the control means 16 in this first embodiment of this invention. The encoder 20 illustrated in FIG. 3 functions, responsive to signals received from the manual controls 19, to generate an eight bit serial stream of audible tones. If additional bits are desired, a plurality of components such as described in FIG. 3 may be utilized. Preferably, the operator of the system operates the manual switches 24 in the manual controls 19 to form a selected decimal number in the range zero to nine. The operator then sets the encoder 20 in operation by depressing start switch 25 in the manual controls 19. Depressing start switch 25 resets counter 26 and the free-running multivibrator 27 in the encoder 20. The output of the counter 26 is coupled to the input of an eight-channel digital multiplexer 28 which functions, in response to the digital count received from the counter 26, to sample the various signals coupled to it from the output lines of the manual controls 19. For example, when the counter 26 is in a zero count state, the digital multiplexer selects the input received over line 29 and couples it through its output to NAND gates 30 and 32.

If the output level of the multiplexer is "high," the gate of field effect switch 33 is forced to a "high" logic level and the gate of field effect switch 34 is forced to a "low" logic level. With this condition, field effect switch 33 is off and field effect switch 34 is on, which allows the signal output of tone generator 35 to be applied over output line 21.

If the output level of the multiplexer is "low," field effect switch 33 is on and field effect switch 34 is off, which allows the signal output of tone generator 36 to be applied over output line 21.

Preferably the multivibrator output is combined with the multiplexer output to limit the duty cycle of the applied tone frequency to 50 percent of the total bit period. This produces an absent of tone immediately prior to each tone $f_1$ or $f_2$, and, as a result, enhances signal clarity and adds a "clocking" aspect to the serial stream of audible tones. Rather than utilizing the presence and absence of the tones $f_1$ or $f_2$ to add a clocking aspect to the serial stream of tones, phasing encoding of the tones, such as is well known to skilled artisans, could be utilized to add a clocking aspect to the serial stream of tones.

Preferably the first negative going clock signal from the multivibrator 27 switches counter 26 from count state zero to count state one. When a count state of one is applied to the multiplexer 28 the multiplexer selects the next output line 37 of the manual controls as its input and couples it through its output to NAND gates 30 and 32. The tone frequency ($f_1$ or $f_2$ generated by tone generators 35 or 36) selected for output over line 21 again depends on the logic state of the output of the multiplexer 28 which, in turn, depends on the logic state of the signal received at its input from the manual controls 19.

The counter 26 continues to count until it attains a count of eight. Thereupon, the count of eight stops the multivibrator 27 and turns off field effect switches 33 and 34. The encoder 20 will remain in this inactive state until the start switch 25 is again depressed.

Preferred commercially available components for the encoder 20 are as follows:

| | |
|---|---|
| Multiplexer 28 | DM 74151 |
| Counter 26 | DM 74197 |
| Multivibrator 27 | Control Logic, Inc. CCM-151T |
| Tone generators 35 and 36 | LM 567 |
| Gates 31 and 32 | DM 7410 |
| Gate 30 | DM 7404 |
| Field Effect Switches 33 and 34 | Intersil DG 188 |

It is preferable that in this first embodiment of the invention, the electromagnetic signal generated by the control means 16 and transmitted to the seismic energy source and the various geophone monitoring means, contain 57 bits of digital data. This can be accomplished by coordinating eight of the previously described manual control and encoder components. Preferably the first 48 bits of the data stream are utilized to transmit information describing the selected operation to be performed by the various geophone monitoring means and, when applicable, describing the location of the seismic energy source about to be shot. Preferably the next 8 bits of the data stream are utilized to transmit the "time break" data, the use of which in an electromagnetic signal is well known to those skilled in the art, instructing the seismic energy source and/or the various geophone monitoring means to immediately perform the preselected or commanded operation. Preferably, the last bit of the data is an odd parity bit for the entire serial stream of data.

Figure 4:
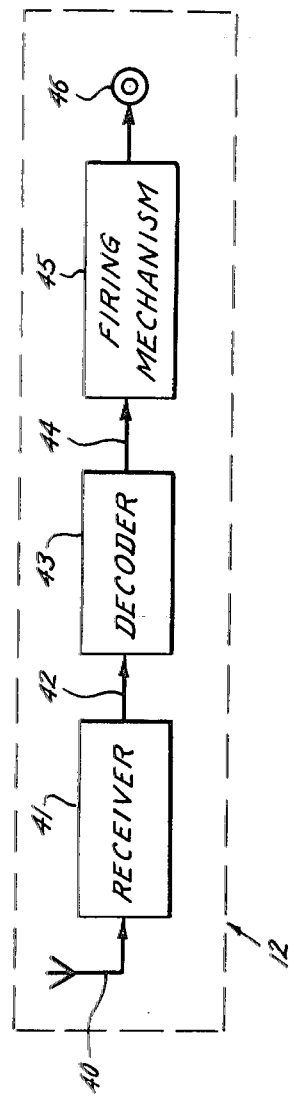
FIG. 4 is a block diagram of the electrical components of a preferred seismic energy source in the first embodiment of the seismic geophysical exploration system according to this invention.

FIG. 4 illustrates in block diagram a preferred seismic energy source to be utilized in this embodiment of the invention. The seismic energy source is constructed to perform a preselected operation — producing a shot — upon receiving preselected data in the electromagnetic signal generated by the control means. The seismic energy source 12 preferably includes an antenna 40 for receiving passing electromagnetic signals. The signals received by antenna 40 are coupled to the input of a receiver 41 which functions to select the desired signals from the mass of electromagnetic signals intercepted by the antenna 40. The receiver 41 may be any of numerous commercially available apparatus, such as a General Electric LB1-3546P. The output of the receiver 41 is coupled over line 42 to the input of a decoder 43 which functions to transform the serial stream of audible tones selected by the receiver 41 into a serial stream of digital data and to generate an electrical signal representative of the information contained in the digital data. The output of the decoder 43 is coupled over line 44 to a firing mechanism 45 which functions to cause the energy means 46 to discharge. The firing mechanism 45 may be any of numerous commercially available apparatus, such as Geo Space HS 1200. The energy means 46 may be a high explosive charge or a low energy source such as a DINOSEIS. The energy means 46 is in physical communication with the earth and when it discharges, it generates seismic waves through the earth.

Figure 5:
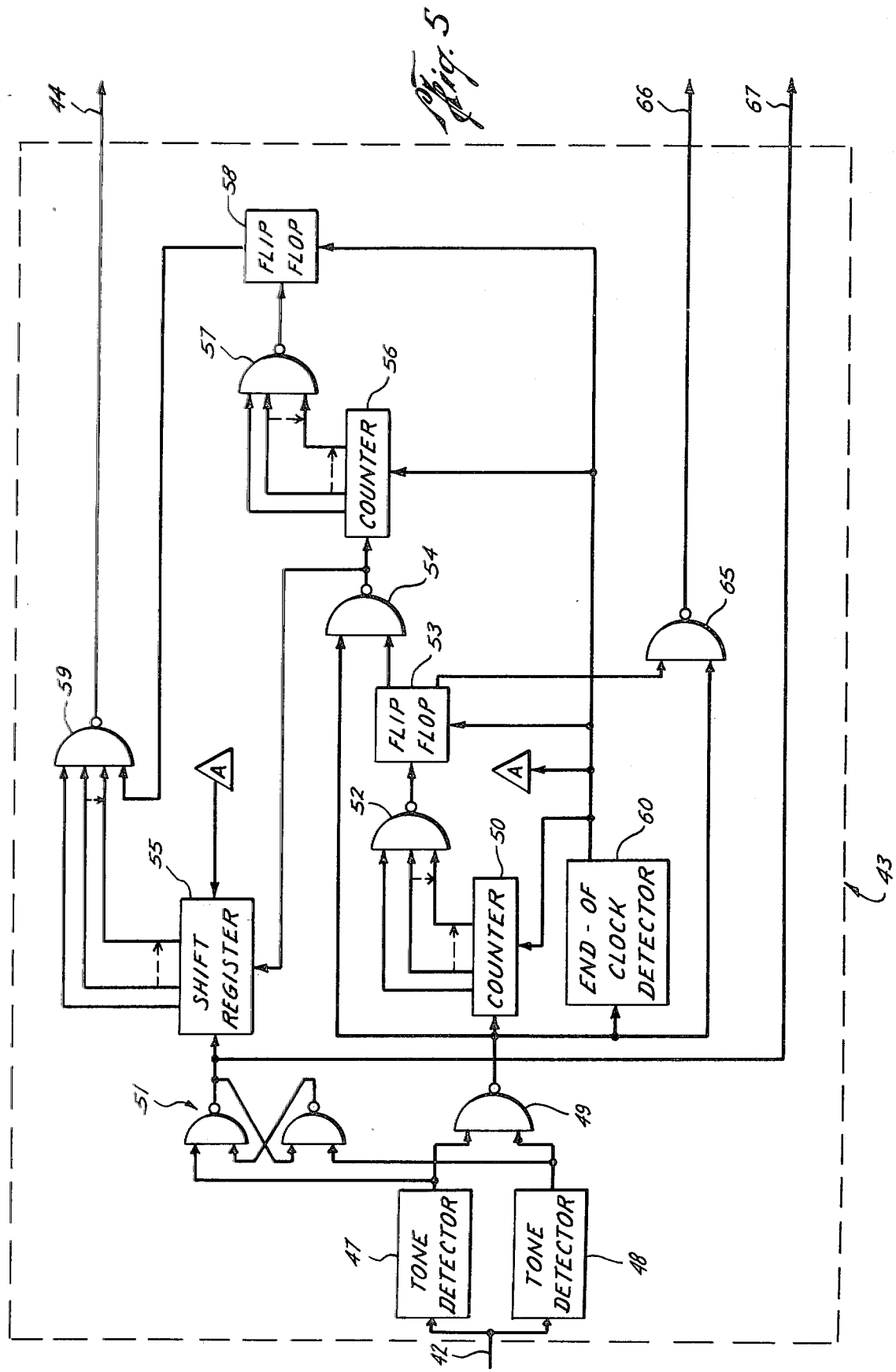
FIG. 5 is a partial schematic and partial block diagram of the preferred components of the decoder of the seismic energy source illustrated in FIG. 4 and the preferred components of a decoder which may be employed in a preferred geophone monitoring means as illustrated in FIG. 6.

FIG. 5 illustrates a preferred decoder 43 to be utilized in the seismic energy source 12 in this embodiment of the invention. The serial stream of audible tones generated by the output of the receiver 41 are coupled over line 42 to tone detectors 47 and 48. Each of tone detectors 47 and 48 functions to generate a logic signal of a selected level whenever it detects an audible tone of a selected frequency. The outputs from the tone detectors 47 and 48 are combined through gate 49 to form a clock signal comprised of a serial stream of digital pulses. The clocking signal is supplied to a counter 50 and other components of the decoder 43 as will hereinafter be explained. The outputs of the tone detectors 47 and 48 are also supplied to a latch circuit 51. The latch circuit 51 combines the outputs of the tone detectors 47 and 48 to form a serial stream of digital data representative of the serial stream of audible tones $f_1$ or $f_2$ supplied over line 42 to the decoder 43.

As previously mentioned, preferably the 8 bits of the serial data stream following the first 48 bits, contain the time break data utilized to initiate immediately the preselected operation of the seismic energy source 12. As such, the data contained in the first 48 bits is not needed by the seismic energy source 12 and is not stored by the decoder 12 contained in the seismic energy source 12. Rather, the count derived from this data is used to advance counter 50 to count state 48. A count of forty-eight by counter 50 is detected by gate 52 and the output of gate 52 is utilized to set flip-flop 53. The output of flip-flop 53 is gated through gate 54 with the clocking signal from gate 49 to form the clock signal for shift register 55. The data input for shift register 55 is derived from data latch circuitry 51. During the time the eight bit data group is being received by the shift register 55, the clock signal which drives shift register 55 is also driving counter 56. When a count of eight on counter 56 is detected by gate 57, flip-flop 58 is set — thereby activating gate 59. Gate 59 is an eight input gate which functions to examine the contents of shift register 55. If the contents of this register contains the necessary logic levels to force all eight inputs to gate 59 to the high state, an electrical signal of preselected logic level will be generated at the output of gate 59. This electrical signal generated at the output of gate 59 is coupled over line 44 to the input of a firing mechanism 45 as shown in FIG. 4. After the serial data stream has been completely transmitted to the decoder 43, the clocking signal from gate 49 will no longer exist. The end-of-clock-detector 60 will detect that the clocking signal no longer exists, and the output from this end-of-clock-detector 60 is utilized to reset counters 50 and 56 and flip-flops 53 and 58 and shift-register 55.

Preferred commercially available components for the decoder 43 are as follows:

| | |
|---|---|
| Tone detectors 47 and 48 | LM 567 |
| Counters 50 and 56 | DM 74197 |
| End-of-clock-detector 60 | A Schmidt trigger combined with a one-shot |
| Shift register 55 | DM 74174 |
| Flip-flops 53 and 58 | DM 7474 |

Certain additional components in the decoder 43 and illustrated in FIG. 5 shall be described hereinafter with respect to the geophone monitoring means 14 utilized in this first embodiment of the invention.

Figure 6:
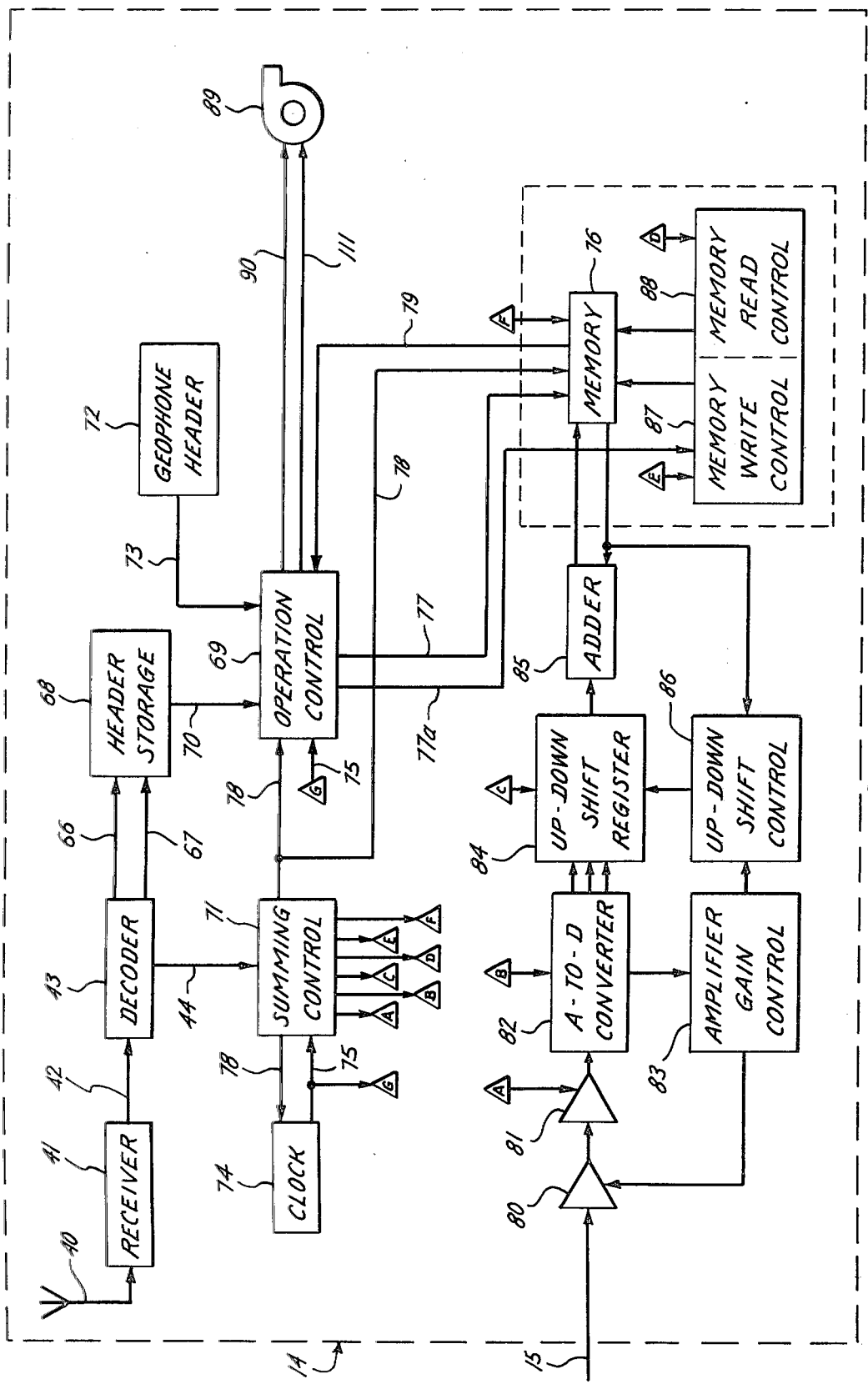
FIG. 6 is a block diagram of the electrical components of a preferred geophone monitoring means in the first embodiment of the seismic geophysical exploration system according to this invention.

FIG. 6 illustrates in block diagram a preferred geophone monitoring means 14 to be utilized in this embodiment of the invention. The geophone monitoring means is constructed to perform a preselected operation upon receiving preselected data in the electromagnetic signal generated by the control means. An antenna 40 intercepts the passing electromagnetic signals. The output of the antenna is coupled to the input of a receiver 41 which functions to select the desired audible tones $f_1$ or $f_2$ from the mass of electromagnetic signals intercepted by the antenna. The receiver may be any of numerous commercially available apparatus, such as the General Electric LB1 3546P. The stream of audible tones output by the receiver 41 is coupled to the input of a decoder 43 which functions to transform the serial stream of audible tones supplied to its input into a serial stream of digital bits and transmit the serial stream of digital bits to the other components of the geophone monitoring means. The decoder 43 also functions to examine the time break portion of the serial stream of digital bits and generate an electrical signal representative thereof. The decoder 43 preferably is similar to the decoder 43 described and illustrated in FIG. 5. However, when the decoder apparatus illustrated in FIG. 5 is used in the geophone monitoring means 14, preferably the clocking signal generated by gate 49 is gated through gate 65 and supplied over line 66 as a clocking signal to certain other components in the geophone monitoring means as will hereinafter be described. In addition, the data stream generated by the latching circuitry 51 is supplied over line 67 to certain other components in the geophone monitoring means as will hereinafter be described. When the decoder 43 is utilized in a geophone monitoring means 14 in this first embodiment of the invention, preferably the gate 59 is only a seven-input gate so that the time break portion of the electromagnetic signal will cause the gate 59 to generate an electrical signal of a preselected logic level if only the first seven bits stored in the register 55 are of the necessary logic levels. The electrical signal so generated by gate 59 is supplied to additional components in the geophone monitoring means as will hereinafter be described.

Referring now to FIG. 6, the clocking signal generated by gate 49 and the digital data stream generated by the latching circuitry 51 in the decoder 43 are supplied over lines 66 and 67, respectively, to the input of a header storage apparatus 68. Header storage apparatus 68 functions, responsive to the clocking signals generated by decoder 43 over line 66, to receive over line 67 the entire digital data stream and to store such data stream in parallel digital bit format. Upon command, the data stored in the header storage 68 is supplied to an operation control means 69 over line 70. Header storage means 68 may be any of numerous commercially available apparatus, such as a National Semiconductor SN74174. The electrical signal generated by gate 59 in the decoder 43 is coupled over line 44 to the input of a summing control means.

Also coupled to the input of the operation control means 69 is the output of a geophone header 72. The geophone header 72 functions, responsive to the control of the person who implaces the geophone monitoring means 14 in position, to input data over line 73 into the operation control means 69 representative of the physical location of the particular geophone monitoring means 14. Preferably there is associated with the geophone header 72 manual controls (not shown), such as an EECO switch 1976060, which allow such person to input the desired information.

Coupled to the summing control means 71 is a clock means 74 which functions to generate a digital count at a selected, constant time interval. This digital count is supplied to the summing control means over line 75. The clock means 74 may be any of numerous commercially available apparatus, such as a Motorola K1091A crystal oscillator and a clock device from the National Semiconductor 7400 Series Logic Family.

Coupled to the operation control means 69 is a memory means 76. Memory means 76 functions, responsive to control signals received from operation control means 69 over line 77 and from the summing control means 71 over line 78, to store the digital data accessed to it. Upon command, the data stored in the memory means 76 is supplied to the operation control means 69 over line 79. The memory means 76 may be any of numerous commercially available apparatus, such as a Texas Instruments TMS4030JL Random Access Memory.

The outputs of the various geophones 13 in the set of geophones with which the geophone monitoring means 14 is associated, are combined together and coupled through line 15 to the input of an amplifier 80. Amplifier 80 functions to amplify and shape the electrical signals generated by the plurality of geophone 13. The amplifier 80 may be any of numerous commercially available apparatus, such as a geospace DAS1700 Seismic Amplifier.

The output of amplifier 80 is coupled to the input of a sample-and-hold device 81. Also coupled to the input of the sample-and-hold device 81 is an enabling signal generated by the summing control means 71. The sample-and-hold device 81 functions, responsive to the enabling signal, to sample the amplified electrical signal generated by the amplifier 80 at selected time intervals and to maintain such sampled signal at its output for a selected period of time. The sample-and-hold device 81 may be any of numerous commercially available devices such as a Datel SHM-CM.

The output of the sample-and-hold device 81 is coupled to an input of an analog-to-digital converter 82. Also coupled to the input of the analog-to-digital converter 82 is an enabling signal generated by the summing control means 71. The analog-to-digital converter 82 functions, while enabled, to convert the electrical signal supplied to its input into a digital signal. The output of the analog-to-digital converter 82 is also coupled to the input of an amplifier gain control device 83, which may be any of numerous commercially available apparatus such as a DM 74194. The amplifier gain control 83 functions responsive to the magnitude of the signal generated by the analog-to-digital converter 82, to control the gain of the amplifier 80.

The digital output signal of the analog-to-digital converter, preferably in binary coded data format, is coupled to the input of an up/down gain apparatus 84. Also coupled to the input of the up/down gain apparatus 84 is an enabling signal generated by the summing control means 71. The up/down shift register functions, while enabled, to increase or decrease the magnitude of the logic levels of the digital signal generated by the analog-to-digital converter 82. The analog-to-digital converter and the up/down gain apparatus may be any of numerous commercially available apparatus, such as a Datel ADC-CM12B and a Texas Instruments SN7495 Right-Left Shift Register, respectively.

The output of the up/down gain apparatus 84 is coupled to the input of an adder 85. The adder 85 functions to sum the digitized data supplied to it from the up/down gain apparatus 84 with such digitized data as may be supplied to it from the memory means 76. The adder 85 may be any of numerous commercially available apparatus, such as a Texas Instruments SN7483 Four-bit Full Adder.

Coupled to the output of the memory means 76 and to the output of the amplified gain control 82, ia an up/down shift control 86. The up/down shift control 86, which may be any of numerous commercially available devices such as a DM 74194, functions to control the gain of the up/down shift register 84. The operation of the up/down shift register to normalize the magnitude of the digital signal generated by the analog-to-digital converter may be as described by U.S. Pat. No. 3,466,596.

Associated with the memory means 76 are a memory write control means 87 and a memory read control means 88 which function conjunctively, responsive to signals received from the summing control means 71, to control the transfer of data from the memory means 76 to the adder 85 for summing with data being received by the adder 85 from the up/down shift register 84, and to control the accessing of the summed data back from the adder 84 to the memory means 76.

Coupled to the output of the operation control means 69 is a recorder means 89, such as a small, cassette tape recorder MFE Model 250 Digital Cassette Tape Transport. Recorder means 89 functions, responsive to command signals received from operation control means 69 over line 90, to make a record of the data transmitted to it from the operation control means 69.

Figure 7:
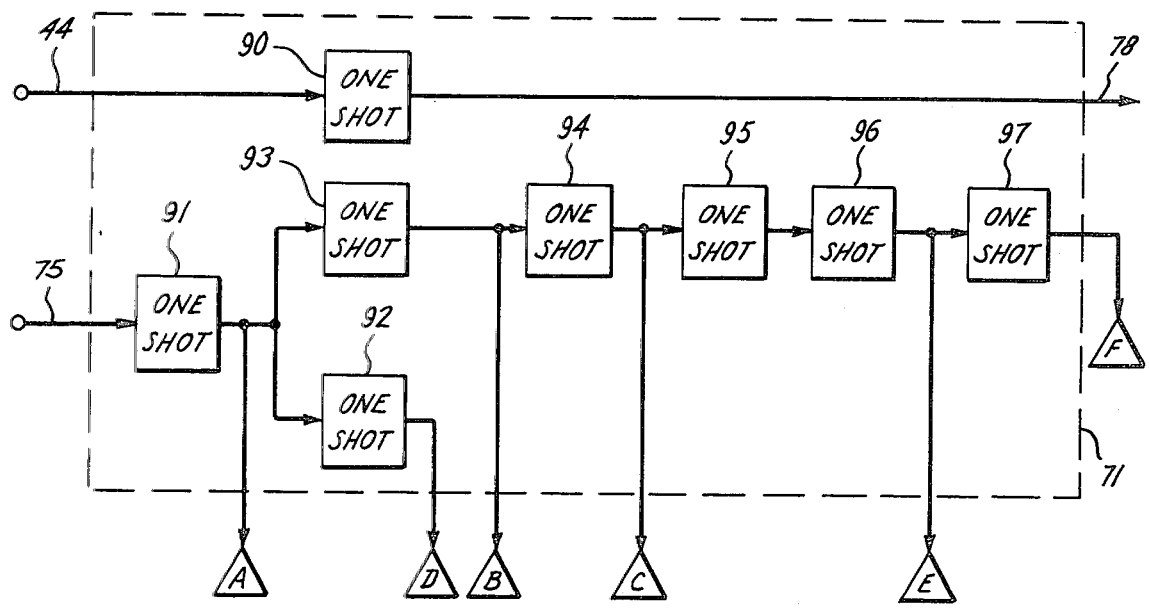
FIG. 7 is a partial schematic and partial block diagram of the preferred components of the summing control means utilized in the geophone monitoring means in the first embodiment of the seismic geophysical exploration system according to this invention.

Referring to FIG. 7, there is illustrated in block diagram form the preferred components of the summing control means 71 to be utilized in the geophone monitoring means 14 in this first embodiment of the invention. Coupled to a one-shot 90 over line 44 is the electrical signal generated by gate 59 in the decoder 43. This one-shot 90 transforms such electrical signal into an electrical pulse of short duration. The output pulse from one-shot 90 is supplied over line 78 to the clock 74 to reset the operation of such clock. The output pulse from the one-shot 90 is also coupled over line 78 to the input of the operation control means 69 as will be hereinafter explained and is coupled to the memory device 76 to reset the memory device 76 to a zero address state.

Once the clock 74 has been reset by the electrical pulse generated by one-shot 90, clock 74 commences generating a digital clocking signal. The clocking signal is supplied over line 75 to a one-shot 91 which functions to generate, responsive to each clock pulse, a corresponding enabling signal for the sample-and-hold device 81. The enabling signal generated by one-shot 91 is supplied to one-shots 92 and 93. One-shot 92 generates responsive thereto an enabling electrical signal of selected time duration which is coupled to the memory read control means 88. One-shot 93 generates an enabling electrical signal of selected time duration for the analog-to-digital converter 82.

The enabling signal generated by one-shot 93 is supplied to one-shot 94 which generates responsive thereto an enabling electrical signal of selected time duration for the up/down shift register 84. The enabling signal generated by one-shot 94 is supplied to one-shot 95 which generates a delaying electrical signal of a selected time duration sufficient to allow the data stored in the memory means to be read from the memory and summed by the adder with the incoming data. The delaying electrical signal generated by one-shot 95 is coupled to one-shot 96 which generates responsive thereto an electrical signal which is coupled to the memory write control 87. The electrical signal generated by one-shot 96 is supplied to one-shot 97 which generates an impulse signal which is supplied to the memory means 76 to advance the memory address counter.

Preferably each of the one-shots in FIG. 7 is an Advanced Microdevices AM 9602. The lettered triangles shown in FIG. 7 correspond to the lettered triangles shown in FIGS. 6 and 9.

Figure 8:
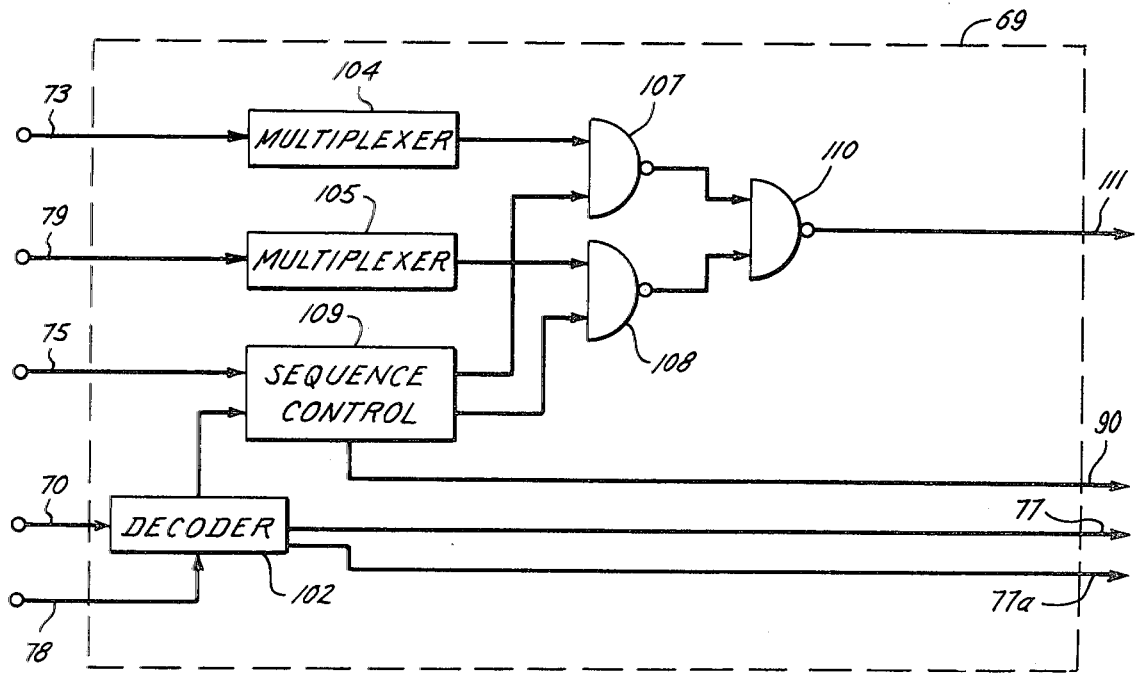
FIG. 8 is a partial schematic and partial block diagram of the preferred components of the operation control means of the preferred geophone monitoring means illustrated in FIG. 6.

Referring to FIG. 8, there is illustrated in block diagram form the preferred components of the operation control means 69 to be utilized in the geophone monitoring means in this embodiment of the invention. The impulse generated by one-shot 90 in the summing control means 71 is supplied over line 78 to an operation decoder 102. Once enabled by such pulse, the operation decoder 102 examines over line 70 the first 48 bits of data stored in header storage 68. The first 48 bits of the data stored in the header storage specifies the type of operation to be performed by the operation control means and, if the geophone monitoring means is to receive electrical signals from the associated geophones responsive to a shot by the seismic energy source, the location of the seismic energy source about to produce the shot. The operation decoder 102, preferably a forty-eight input gate composed of the 7400 series, decodes the data and determines the type of operation to be performed by the operation control means. Depending upon the type of operation to be performed, the operation decoder 102 generates a representative electrical signal which is coupled to the adder 85 over line 77 or is coupled to the memory write control 87 over line 77a.

Supplied to the operation control means 69 over line 73 is the digital data stored in parallel form in the geophone header 72. This digital data is supplied over line 73 to a digital multiplexer 104 which functions to convert the parallel digital data into a serial digital stream. Also supplied to the operation control means 69 over line 79 is the data, in parallel digital bit form, stored in the memory means 76. This digital data supplied over line 79 to the input of a digital multiplexer 105 which functions to convert the parallel digital data into a serial digital data stream. Each of the multiplexers 104 and 105 preferably is composed of a plurality of DM 74151. The output of each of such multiplexers 104 and 105 is coupled to the input of a NAND gate 107 and 108, respectively.

Coupled to the operation control means 69 over line 75 is the clock signal generated by internal clock 74. This clock signal is supplied over line 75 to the input of a sequence control apparatus 109. Also coupled to the input of the sequence control apparatus 109 is the output of the operation decoder 102 contained in the operation control means 69. The sequence control apparatus 109, preferably a five stage shift register comprised of five flip-flops or a 5-bit counter such as a DM 74196, functions, responsive to the clocking signal supplied to its input over line 75 and the signal it receives from decoder 102, to energize the NAND gates 107 and 108 at specific sequential periods of time so that the output of each of the multiplexers 104 and 105 may be gated therethrough to the input of NAND gate 110. The output of NAND gate 110 is supplied over line 111 to the input of the recorder means 89. Sequence control apparatus 109 generates an output signal over line 90 which is supplied to the recorder means 89 to control the operation of the recorder means.

The portion of the geophone monitoring means 14 included within the small dashed rectangle within FIG. 6 is illustrated in partial block diagram and partial schematic diagram in FIG. 9. The preferred components of the memory means 76 and the memory write control 87 and the memory read control 88 are illustrated in FIG. 9 in a form well known to those skilled in the art.

Figure 10:
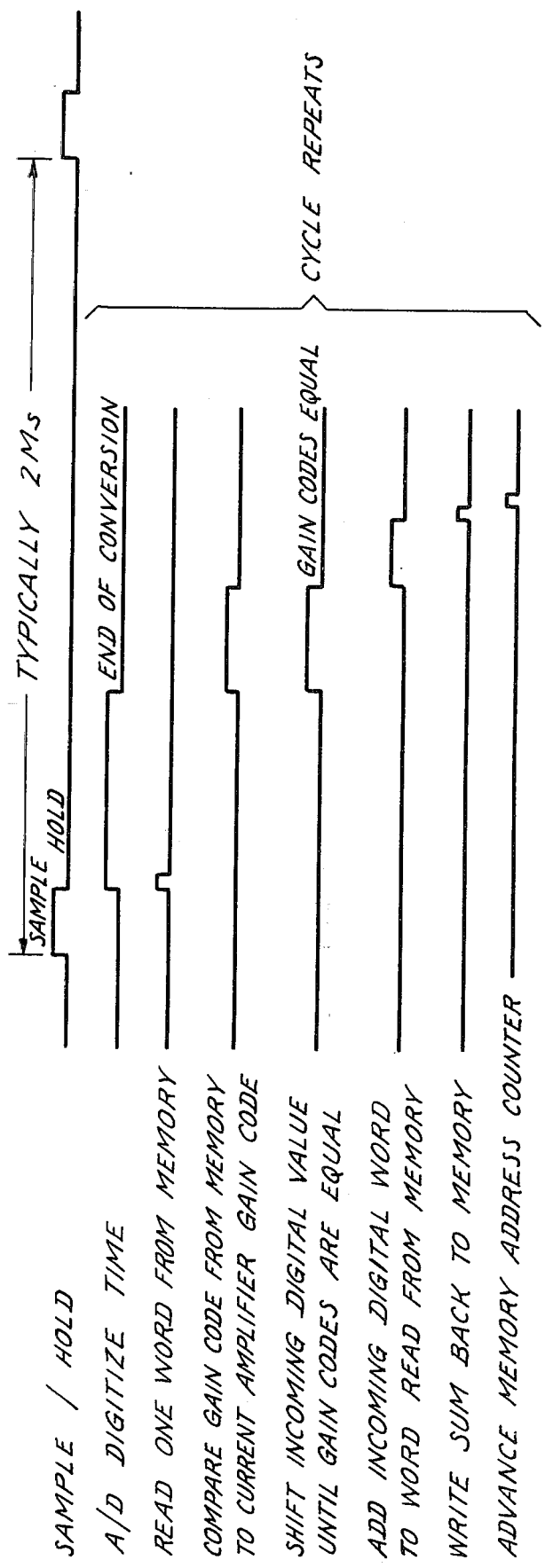
FIG. 10 is a timing chart illustrating the time relationships of the operations of various of the components of the geophone monitoring means.

FIG. 10 illustrates with respect to time the operation of the sample-and-hold device 81, the analog-to-digital converter 82, the adder 85, the memory means 76, and the memory write control 87 and memory read control 88, in a form well known to those skilled in the art.

In the operation of this first embodiment of the seismic geophysical exploration system according to this invention, someone preferably places the control means 16, the seismic energy source 12, each of the geophone monitoring means 14 and the associated geophones 13, in their desired physical locations. If the operator of the system chooses to utilize cables to connect the control means 16 with the seismic energy source 12 and each of the geophone monitoring means 14 for the transmission of the electrical signals generated by the control means, these cables are laid out. Preferably, however, the operator of the system transmits the control data from the control means to the remote units via electromagnetic signals, and the remainder of this description of the operation of the first embodiment of this invention shall assume that the control data is so transmitted. As each geophone monitoring means 14 is placed in position and connected to the geophones in the associated set, the person emplacing the geophone monitoring means activates the power (not shown) for the geophone monitoring means 14 and operates the manual controls (not shown) associated with the geophone header 72 to input into the geophone header 72 information representative of the physical location of the geophone monitoring means 14. As the seismic energy source 12 is emplaced in its desired location, the power (not shown) for such seismic energy source is activated.

The operator of the system then manipulates the manual controls 19 of the control means 16 to cause transmitter 22 to generate an electromagnetic signal over antenna 23. The electromagnetic signal carries data representative of the commands of the operator, and is received by the various geophone monitoring means 14 and the seismic energy source 12. Preferably the operator of the system first transmits an electromagnetic signal containing data commanding the seismic energy source to immediately produce its first shot and commanding the various geophone monitoring means to immediately commence sampling the electrical signal produced by the geophones responsive to the first shot, transducing such sampled signal into digitized data, and storing such digitized data.

Upon the decoder 43 of the seismic energy source 12 decoding the time break data in the electromagnetic signal commanding the seismic energy source to produce a shot, an electrical signal is supplied to the firing mechanism 45 which causes the energy means 46 to generate seismic waves through the earth.

When the electromagnetic signal is received by the geophone monitoring means, the entire digital data stream is temporarily stored in the header storage 68. Upon the decoder 43 decoding the time break portion of the digital data stream and generating a representative electrical signal over line 44 to the summing control means 71, an electrical impulse is supplied from the summing control means 71 over line 78 to the operation decoder 102 in the operation control means 69. The operation decoder 102 examines the data stored in the header storage 68 and generates a representative signal over line 77 to the memory means 76. Since the commanded operation was for the geophone monitoring means to sample and store the data produced by the geophones responsive to the first shot of the seismic energy source, the electrical signal supplied over line 77 to the memory means 76 and the associated circuitry shown in FIG. 9, disables or prevents the adder from summing the incoming data with any "data" stored in the memory means 76. (Since this is the first shot by the seismic energy source, any data already in the memory device will be extraneous.) This is accomplished by the electrical signal supplied over line 77 resetting the memory output register to zero digital value during the time period of the sampling of the electrical signal generated by the geophones responsive to the first shot. At the same time, the summing control means 71 is generating the various enabling electrical signals to the sample-and-hold device 81, the analog-to-digital converter 82, the up/down shift register 84, the memory write control 87, the memory read control 88, and the memory means 76.

As the associated geophones generate an electrical signal representative of the seismic waves sensed thereby, such electrical signal is amplified by amplifier 80, the amplified electrical signal is sampled by sample-and-hold device 81, and the sampled data is converted to digital format by the analog-to-digital converter 82. When the sampled data in parallel digital format is received by the adder 85, this data is in effect added to a digital word of zero value and the sum is supplied to the memory means 76 and stored therein.

At this point, the operator of the system may elect to transmit an electromagnetic signal commanding the various geophone monitoring means to immediately make a record of the data stored in the geophone header 72 and in the memory means 76. This is accomplished by the electromagnetic signal being decoded by decoder 43 in the geophone monitoring means and the digital data stream being accessed to the header storage 68. When the time break portion of the signal is decoded by the decoder 43, the summing control means 71 generates an electrical signal over line 78 to the decoder 102 in the operation control means 69. Decoder 102 examines the message stored in the header storage 68, generates a disabling signal over line 77a to the memory write control 87, and generates an enabling signal to the sequence controller 109 in the operation control means 69. The sequence controller 109 operates the NAND gates 107 and 108 sequentially whereby data is accessed over line 111 onto the recorder means 89 representative of the location of the geophone monitoring means and the returning seismic waves detected by the set of geophones associated with the geophone monitoring means. The recording means 89 makes a record of such data. The seismic energy source does not produce a shot responsive to the time break portion of the electromagnetic signal because the time break data which commences the recording operation of the geophone monitoring means is different from the time break data which causes the seismic energy source to produce a shot and the geophone monitoring to perform a selected operation on the seismic data generated thereby; the use of an eight-input gate 59 and a seven-input gate 59 in the decoder of the seismic energy source and the geophone monitoring means, respectively, allows this difference in the time break data to be properly recognized.

On the other hand, the operator of the system may elect to stack or vertically sum two or more shots by the same seismic energy source or by different seismic energy sources. In this event, the operator of the system causes the control means to generate an electromagnetic signal containing data commanding the seismic energy source 12 to immediately produce another shot and commanding the various geophone monitoring means to immediately commence sampling the electrical signal produced by the geophones responsive to such shot. tranducing the sampled signal into digitized data, summing such incoming data with the data previously received from the geophones responsive to the first shot, and storing the summed data.

Upon the decoder 43 of the seismic energy source 12 decoding the time break data in the electromagnetic signal commanding the seismic energy source to produce another shot, an electrical signal is supplied to the firing mechanism 45 which causes the energy means 46 to generate seismic waves through the earth.

Upon the decoder 43 of the geophone monitoring means decoding the time break portion of the electromagnetic signal and generating a representative electrical signal over line 44 to the summing control means 71, an electrical impulse is supplied from the summing control means 71 over line 78 to the operation decoder 102 in the operation control means 69. The operation decoder 102 examines the data stored in the header storage 68 and generates a representative signal over line 77 to the memory means 76. Since the commanded operation is for the geophone monitoring means to sample and sum the incoming data with the previously stored data and to store the summed data, no disabling electrical signal is supplied to the memory means 76 over line 77. The summing control means 71 generates the various enabling electrical signals to the sample-and-hold device 81, the analog-to-digital converter 82, the up/down shift register 84, the memory write control 87, the memory read control 88, and the memory device 76. As the associated geophones generate an electrical signal representative of the seismic waves sensed thereby, such electrical signal is sampled by sample-and-hold device 81 and the sampled data is converted into digital format by the analog-to-digital converter 82. As the sampled data in parallel digital format is received by the adder 85, data is read from a time specified memory address stored in the memory means 76, summed by the adder 85 to the incoming digitized word supplied to the adder 84 from the up/down gain apparatus 82, and then the digital sum generated by this process is accessed into the memory means 76 in the same time specified memory address.

After a desired number of shots have been stacked or summed, the operator of the system may generate an electromagnetic signal causing each of the various geophone monitoring means to immediately play out onto the recorder means 89 the data stored in the geophone header 72, and the data stored in the memory means 76 so that the recording means 89 makes a record of the data representative of the location of the geophone monitoring means and the summation of the returning seismic waves sensed by the geophones in response to the various shots produced by the seismic energy source. The time break data in the electromagnetic signal is such that the seven-input gate 59 in the decoder 43 in each geophone monitoring means produces a representative electrical signal but the eight-input gate 59 in the decoder 43 in the seismic energy source does not produce such a signal. The representative electrical signal generated by the decoder 43 and supplied to the summing control means 71 over line 44, causes an electrical impulse signal to be supplied from the summing control means 71 over line 78 to the operation decoder 102 in the operation control means 69. The operation decoder 102 examines the data stored in the header storage 68, generates a disabling electrical signal over line 77a to the memory write control 87, and supplies an enabling signal to the sequence controller 109 in the operation control means 69. Sequence controller generates a start command over line 90 to the recording means 89 to commence its operation. Thereafter, the sequence controller activates NAND gate 108 whereby the data stored in the memory means 76 is scanned and written on the recorder means 89 one word at a time starting at address zero. Preferably, each data word is loaded into the digital multiplexer 105 and shifted out bit by bit through NAND gates 108 and 110 to the recording means 89. Thereafter, the sequence controller activates NAND gate 107 whereby the data from the geophone header 72 is scanned one bit at a time by the digital multiplexer and this bit pattern is supplied through NAND gate 110 and over line 111 to the recorder means 89. After all data is read from the memory means 76 and the geophone header 72, a stop command is supplied to the recorder means over line 90 by sequence controller 109.

At this point, the operation of the system may cease or the operator of the system may cause the seismic energy source to produce another series of shots and another record be made on the recording means of the summed data. Once the operation of the system is complete, the operator of the system causes the tapes or the like to be manually collected from the recording means 89 in the various geophone monitoring means. These tapes are played out sequentially through a mini-computer and put on a standard multiple track tape in a manner that is well known to those skilled in the art. Since each record on the tape is fully identifiable, the records may be properly put together in the usual manner in the main computer.

Thus, this first embodiment of the improved seismic geophysical exploration system according to this invention provides a geophone monitoring means which is positioned in relative close proximity to and coupled with one or more geophones. A control means generates an electrical signal, preferably an electromagnetic signal, containing data which initiates the operation of the seismic energy source and the various geophone monitoring means. The electrical signal includes a time break which initiates immediately the preselected operation of the seismic energy source and/or the various geophone monitoring means. Each of the geophone monitoring means contains an internal clocking apparatus which clocks the operation of its components and thus there is no need for the remotely located control means to generate and transmit a continuous, accurate clocking signal. The geophone monitoring means receives, samples, sums, stores, and ultimately records data representative of the returning seismic waves sensed by the associated geophones.

B. Embodiment in which the control means generates an electromagnetic signal containing data instructing the seismic energy source and/or the various geophone monitoring means to perform a preselected operation at a preselected future instant of time.

In the first embodiment of this invention (described in Section A hereof), the electrical signals generated by the control means may be transmitted to the seismic energy source and the remote geophone monitoring means by long cables or the electrical signals can be transduced into electromagnetic signals and transmitted to the remote units through the atmosphere. When the electrical signals generated by the control means are transduced into electromagnetic signals and transmitted through the atmosphere, it is preferable that the seismic energy source and each of the various geophone monitoring means be physically positioned close enough to the control means for there to be good communication of the electromagnetic signals generated by the control means. This is preferable because in the first embodiment of the invention, the control means generates an electromagnetic signal which includes time break data. When each of the seismic energy source and the various geophone monitoring means receives the time break portion of the electromagnetic signal, it immediately commences the preselected or commanded operation. If the communication between the control means and the seismic energy source or the various geophone monitoring means is not relatively good, the time break portion of the electromagnetic signal may be improperly received or not received at all by one or more of the components of the system. The particular component of the system which improperly receives the time break portion of the signal or misses completely the time break portion of the signal, will not commence its preselected operation at the same time as the other components of the system.

The second embodiment of the seismic geophysical exploration system according to this invention provides a method and apparatus which allows the electromagnetic signals generated by the control means to be sent repeatedly, whereby the chance of a communication error is reduced. In the second embodiment of the invention, the control means generates an electromagnetic signal containing data commanding the synchronization of the internal clocking devices within the seismic energy source and the various geophone monitoring means; thereafter, the control means generates an electromagnetic signal containing data commanding the seismic energy source and/or the various geophone monitoring means to perform a preselected operation at a selected future instant of time based upon the time provided by the internal clocking devices.

In this second embodiment of the seismic geophysical exploration system according to this invention, a seismic energy source 12, a plurality of geophones 13, and a plurality of geophone monitoring means 14 associated with selected of the geophones, are employed as described with respect to FIG. 1. A control means 16 is utilized by the operator of the system to indicate the operation of the seismic energy source 12 and the geophone monitoring means 14. Similarly to the control means 16 described with respect to the first embodiment and illustrated in FIG. 2, the control means 16 utilized with the second embodiment of the invention preferably includes certain manual controls, an encoder 20, a transmitter 22 and an antenna 23. Preferably, the encoder 20 functions to receive the electrical signals input to it by the operator of the system through the manual controls and to generate a serial stream of audible tones having frequency $f_1$ or $f_2$, which stream of tones is transmitted by transmitter 22 to the seismic energy source and the various geophone monitoring means. The transmitter 22 and the antenna 23 preferably are as described with respect to FIG. 2.

Figure 11A:
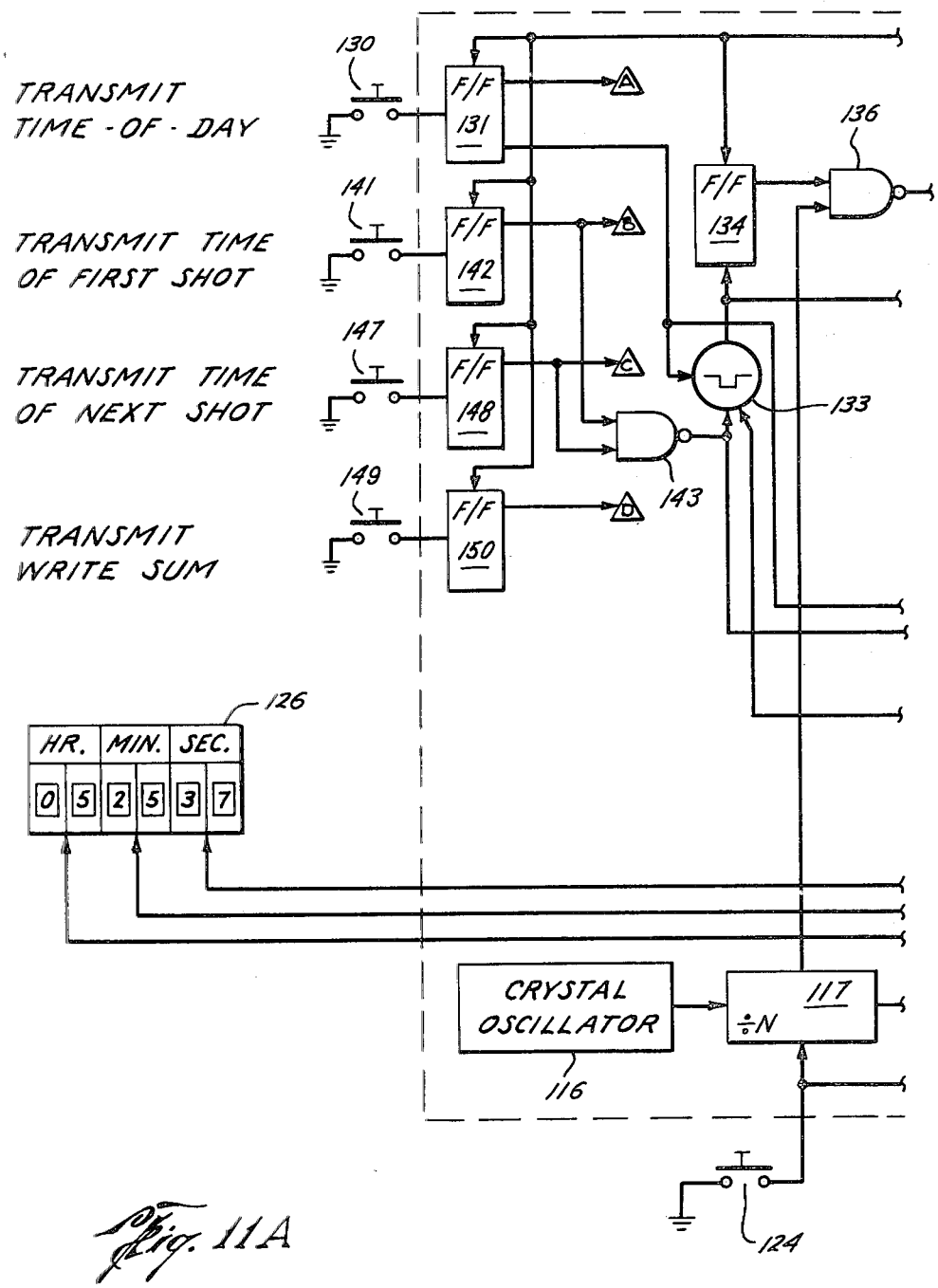
FIGS. 11A and 11B are a partial schematic and partial block diagram of the electrical components of the preferred manual controls and encoder in the control means in the second embodiment of the seismic geophysical exploration system according to this invention.
Figure 11B:
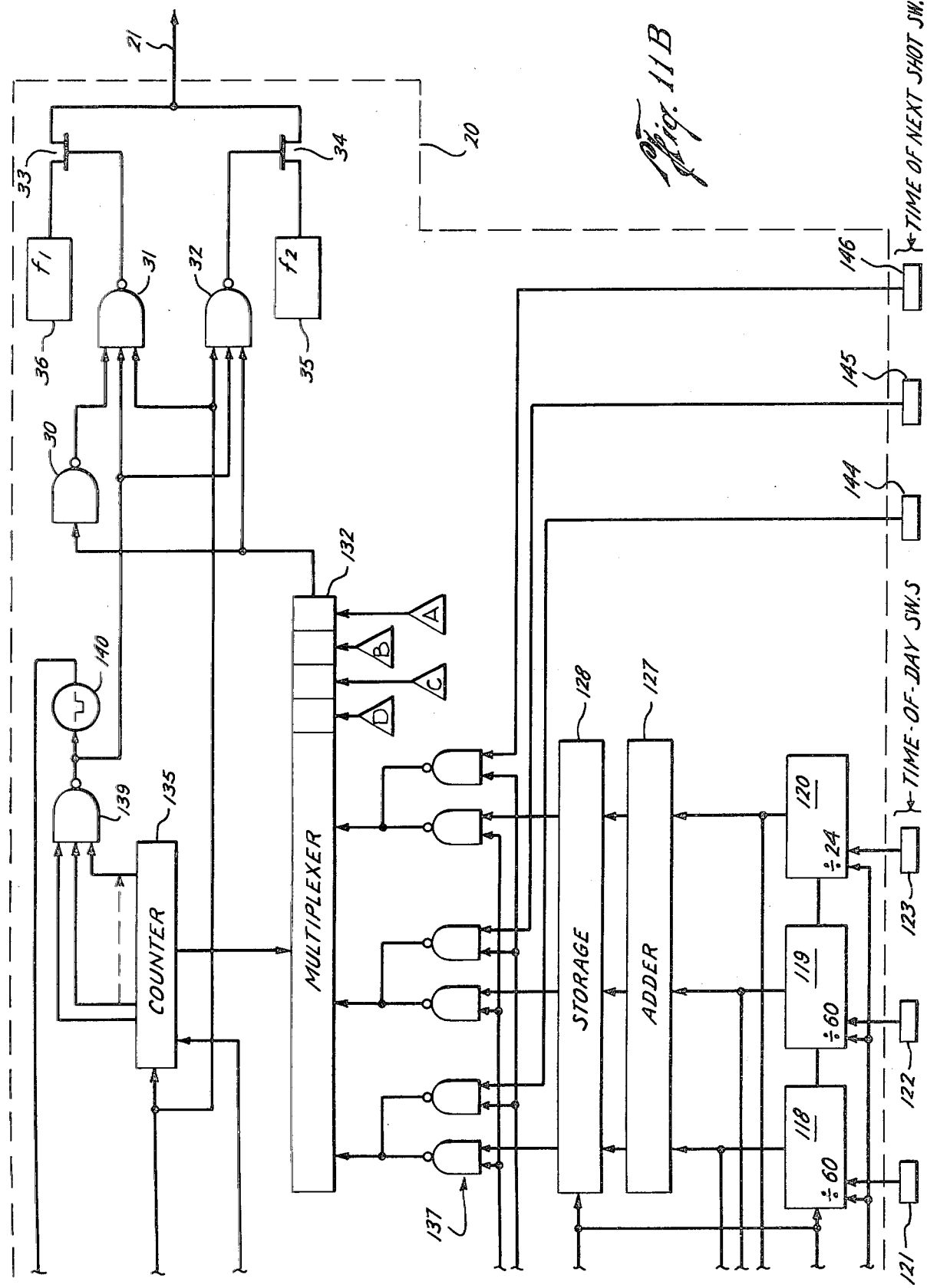

The preferred components of the manual controls and the encoder 20 utilized in the control means 16 in this second embodiment of the invention, are described in FIGS. 11A and 11B. In this second embodiment of the invention, the control means 16 is constructed such that the operator of the system can cause the control means 16 to generate a serial stream of audible tones indicative of the time-of-day. The encoder 20 generates time-of-day information data by counting down the frequency output of a highly precise, low-drift, crystal oscillator 116. The output of the crystal oscillator 116 is coupled to the input of a divide-by-N counter 117. The divide-by-N counter 117 functions to derive a signal which is a selected increment of time, preferably one second. This one-second signal is then coupled to the input of a seconds counter 118 which first divides by ten and then divides by six, giving an end-to-end divide ratio of 60. The output from the seconds counter 118 is coupled to the input of a minutes counter 119 which functions to divide the output of the seconds counter 118 by 60. The output of the minutes counter 119 is utilized to drive the hours counter 120 which functions to divide the output of the minutes counter by 24. Thus, the clock system functions to divide the frequency of the crystal oscillator down to a one-day period of 24 hours. The components of the encoder clock system are well known to those skilled in the art and may be constructed from any of numerous commercially available apparatus, such as DM 74196 or DM 7474.

The operator of the system sets the initial selected time-of-day data into the various counters in the clock system of the encoder by manipulating the manual switches 121, 122 and 123 to the desired time and then depressing the set-time switch 124. Once the operator of the system inputs the selected initial time-of-day data, the clock system in the encoder 20 continuously generates electrical signals in digital format indicative of the current time-of-day. The current time-of-day data is coupled to other components in the encoder as will hereinafter be described and is continually displayed on an indicator 126 located in the control means 16.

Since the encoder 20 requires a finite period of time in which to transmit the digital time-of-day signals, it is preferable that the digital "word" presented in parallel form by the plurality of electronical signals generated by the encoder clock system, be the current time-of-day plus a selected increment of time. In the encoder illustrated in FIGS. 11A and 11B, it is preferable that the serial stream of audible tones generated by the encoder consist of 24 bits. The first four bits of this serial stream preferably comprise data identifying the type of message being transmitted. The next twenty bits of the serial stream preferably comprise data supplying the selected message, which in the second embodiment of the invention, is a time-of-day message. The time increment to be added to the current time-of-day by the adder 127, therefore, preferably is the time required for the transmission of the time-of-day message by the 24 bit serial stream; then if the message being transmitted is current time-of-day, when the last bit of the serial stream is transmitted and received by the remote seismic energy source and the various geophone monitoring means, the time-of-day message will coincide with the current time-of-day. The preferred encoder 20 adds one second to the current time-of-day by supplying the output signals from the clock system to an adder 127. The output of the adder 127 is coupled to the input of a storage register 128 which stores therein the digital word indicative of the current time-of-day plus 1 second.

As will hereinafter be explained, in this second embodiment of the seismic geophysical exploration system according to this invention, each of the seismic energy sources and the various geophone monitoring means includes an internal clocking device which shall be synchronized to a selected time-of-day by the electromagnetic signals generated by the control means 16. When the operator of the system wishes to transmit electromagnetic signals containing data indicative of a selected time-of-day and to command the synchronization of the clocking devices in the seismic energy source and the various geophone monitoring means, he depresses transmit-time-of-day switch 130. Depressing switch 130 causes flip-flop 131 to change to a reset condition and the output of the flip-flop 131 to assume a selected logic level. This selected logic level is input to the first bit position of multiplexer 132 and provides the data identifying the type of message being transmitted. The selected logic level output by flip-flop 131 is also supplied to a pulse generator 133 and causes a pulse of short duration to be generated by such pulse generator. The pulse generated by pulse generator 133 is coupled to the input of gating flip-flop 134 and a counter 135. When pulse generated by pulse generator 133 is coupled to the gating flip-flop 134, it presets such gating flip-flop 134 and causes it to generate an electrical signal enabling gate 136 to couple the clock signal from the divide-by-N counter 117 to the counter 135. Since the serial stream of tones preferably comprises 24 bits, counter 135 functions to count from zero to twenty-three. The output of the counter 135 is coupled to the input of the multiplexer 132 and times the operation of the multiplexer 132 to determine which of the bits stored therein shall be supplied over its output. The signal generated by flip-flop 131 is also supplied a set of gates 137 to enable such gates 137 whereby the current time-of-day plus one second is supplied to the multiplexer 132 from the storage register 128.

The count generated by counter 135 is also coupled to the input of gate 139. When gate 139 detects a count of twenty-four it energizes pulse generator 140, which generates a pulse of short duration. The output from pulse generator 140 is coupled to flip-flop 131 and flip-flop 134, presetting flip-flop 131 and resetting flip-flop 134. This causes the outputs of such flip-flops 131 and 134 to change, thereby altering the conditions of gate 136 and the set of gates 137 such that the clock signal is no longer input to counter 135 and the time-of-day signals are no longer input to the multiplexer 132.

The output of the multiplexer 132 is supplied to a network comprising gates 30, 31 and 32, field effect switches 33 and 34, and tone generators 35 and 36, such as have been previously described with respect to FIG. 3. Depending upon the logic level of the output of the multiplexer 132, either frequency $f_1$ and $f_2$ of the tone generators 35 and 36 will be supplied over line 21 to the transmitter 22. As described with respect to FIG. 3, preferably the output of gate 136 is combined with the output of multiplexer 132 to limit the duty cycle of the applied tone frequency to 50 percent of the total bit. This functions to add a clocking aspect of the serial stream of audible tones.

Thus, by manipulating the time-of-day switches 121, 122 and 123 and the transmit-time-of-day switch 130, the operator of the system may cause the control means to generate an electromagnetic signal containing data commanding the seismic energy source and the various geophone monitoring means to synchronize with a selected time-of-day, which preferably is the current time-of-day generated by the clock system of the encoder. The data in the signal preferably is divided into two parts: (a) the address stating that the message is the command for the internal clocking means in the remote units to synchronize with a selected time-of-day and (b) the selected time-of-day message.

When the operator of the system wishes to generate an electrical signal containing data commanding the seismic energy source to produce a shot at a selected future instant of time and commanding the various geophone monitoring means to commence sampling and storing data at such selected future instant of time, the operator of the system manipulates the time-of-shot switches 144, 145 and 146 to input the selected future time-of-day at which the seismic energy source shall produce its first shot and at which the geophone monitoring means shall commence sampling and storing the electrical signal received from the geophones responsive to such shot. Thereafter, the operator of the system depresses transmit-time-of-first-shot switch 141, thereby causing flip-flop 142 to be reset. The output of the flip-flop 142 then assumes a selected logic level which selected logic level is supplied to the second bit position in the multiplexer 132 and is supplied through gate 143 to the input of pulse generator 133 and to the input of the set of gates 137. Pulse generator 133 generates a pulse to the input of flip-flop 134 and the encoder operates as described above when it was generating a serial stream of data indicative of the current time-of-day. The bit word representative of the future time-of-day for the first shot is accessed through the set of gates 137 to the multiplexer 132 and such signals are serially clocked out of the multiplexer to the tone generation network.

Thus, by manipulating time-of-shot switches 144, 145 and 146 and depressing transmit-time-of-first-shot switch 141, the operator of the system causes the control means to generate an electromagnetic signal containing data commanding the seismic energy source to produce its first shot at a selected future time-of-day and commanding each of the various geophone monitoring means to commence, at such selected future time-of-day, sampling and storing the electrical signal generated by the geophones responsive to such shot; the data in the signal again being divided into two parts: (a) the address stating that the message is the command for the first shot to be produced at a selected future time-of-day and (b) the selected future time-of-day that the first shot is to occur.

Thereafter, the operator may desire to command the seismic energy source to produce another shot and to command the various geophone monitoring means to sample the electrical signals generated by the geophones responsive to such shot, sum such data with the data previously sampled and stored in the geophone monitoring means, and store the summed data. In such case, the operator of the system preferably again manipulates time-of-shot switches 144, 145 and 146 to input the selected future time-of-day for such operations to commence. The operator of the system then depresses transmit-time-of-next-shot switch 147 and causes flip-flop 148 to be reset. The operation of the encoder 20 is as previously described with respect to transmitting an electrical signal commanding the seismic energy source to produce its first shot and commanding the geophone monitoring means to commence sampling and storing the electrical signals produced by the geophones responsive to such shot. An electromagnetic signal is generated containing data commanding the seismic energy to produce its next shot at a selected future time-of-day and commanding the various geophone monitoring means to commence sampling, summing and storing data responsive to such shot at the same future time-of-day.

Thereafter, if the operator of the system wishes to generate an electromagnetic signal commanding the various geophone monitoring means to transfer the summed data from its memory means to its recording means and to make a record of such summed data, the operator of the system preferably again manipulates time-of-shot switches 144, 145 and 146 to set the future time-of-day at which he wishes this operation to commence, and then depresses transmit-write-sum switch 149. This causes flip-flop 150 to reset and the operation of the encoder 20 is again as previously described. An electromagnetic signal is generated containing data commanding each of the various geophone monitoring means as to the future time-of-day at which it will commence withdrawing the summed data from its memory device and recording such summed data.

The following is a preferable manufacturer and part number list for the components described in the encoder 20 utilized in the second embodiment of the invention and not previously described in the first embodiment:

| | |
|---|---|
| Oscillator 116 | Bulova PCOXO-5 |
| Divide-by-N counter 117 | National Semiconductor Corp. DM 74197 |
| Manual switches 121, 122 & 123 | EECO 177606 |
| Indicator 126 | Texas Instruments L308 |
| Adder 127 | DM 7483 |
| Storage register 128 | DM 74174 |
| Flip-flops 131, 134, 142, 148 and 150 | DM 7474 |
| Multiplexer 132 | DM 74151 |
| Pulse generators 133 and 140 | Advanced Microdevices ½ AM 5602 |
| Counter 135 | DM 74197 |
| Set of gates 137 and gate 136 | DM 7400 |
| Gate 139 | DM 7430 |
| Gate 143 | DM 7410 |

Figure 12A:
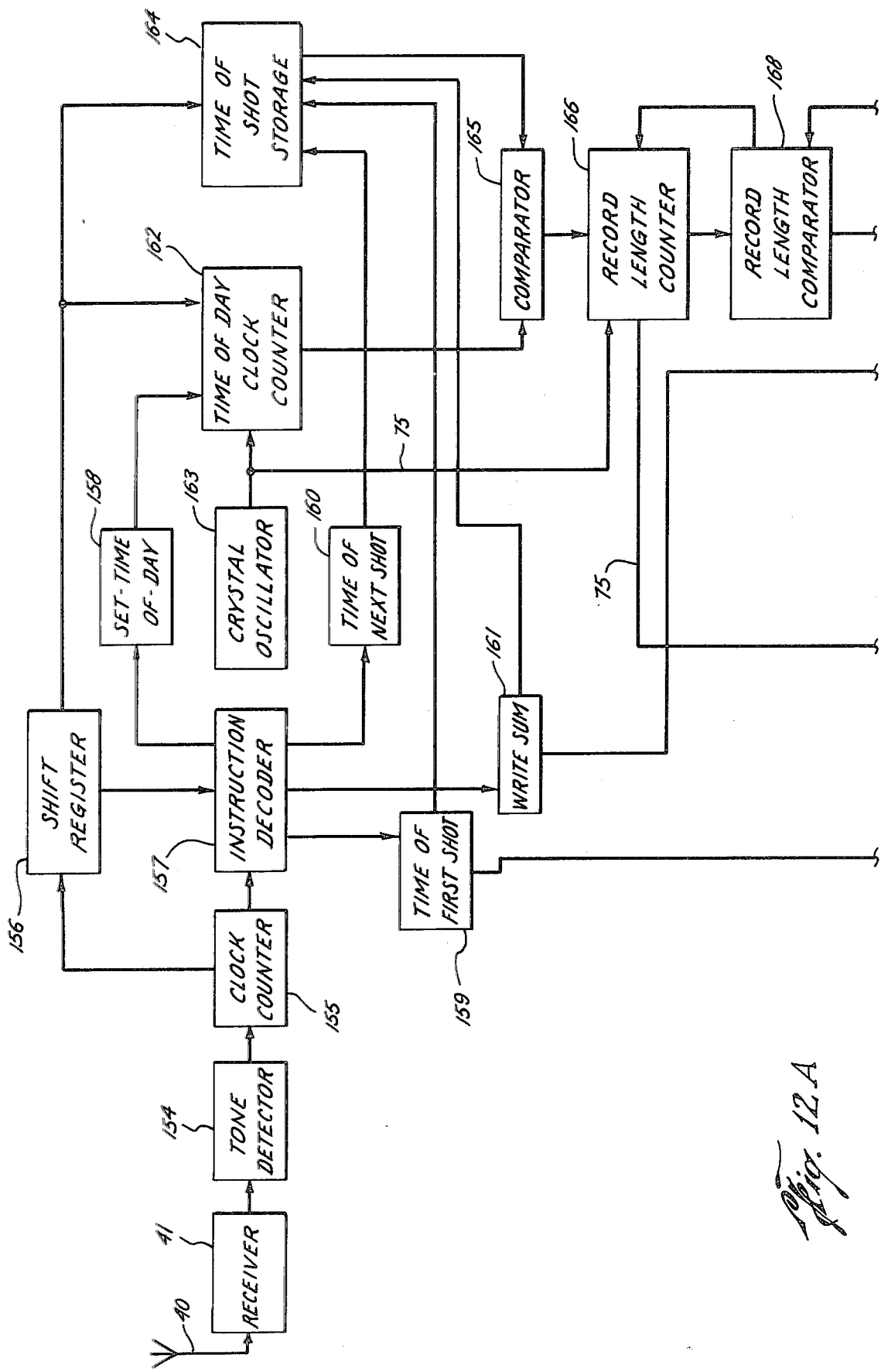

FIGS. 12A and 12B illustrate a preferred geophone monitoring means for this second embodiment of the invention. The electromagnetic signals generated by the control means are detected by antenna 40 and supplied to receiver 41. The output of receiver 41 is coupled to the input of a tone detector 154. The tone detector 154 decodes the signal supplied to its input and generates an electrical signal in digital format which contains the data the operator of the system input into the control means. Tone detector 154 preferably comprises a pair of LM 567 tone detectors 47 and 48 and a latching circuit 51 such as previously described with respect to FIG. 5. The output of tone detector 154 is supplied to clock-counter 155 which functions to examine the bits in the decoded signal to determine if the message length and the rate of message is correct. As the digital signal is being examined by the clock counter 155, the digital signal is accessed into a shift register 156 and temporarily stored therein. If the clock-counter 155 determines that the message length and rate of message of the digital signal is correct, the clock-counter 155 generates an enabling signal which is supplied to the instruction decoder 157. If the clock-counter 155 determines that the message length or rate of message of the digital signal was not received correctly, the clock-counter 155 does not supply an enabling electrical signal to the instruction-decoder 157. Once the instruction-decoder 157 receives the enabling signal, the instruction-decoder 157 examines the first 4 bits of the message stored in the shift register 156 and to determine what type message has been transmitted. Depending upon the type message transmitted, the instruction-decoder 157 emits an impulse electrical signal either to the set-time-of-day device 158, the time-of-first-shot device 159, the time-of-next-shot device 160, or the write-sum device 161.

If the type message being transmitted is a command for the internal clocking device to synchronize with a selected time-of-day, the instruction decoder 157 supplies an electrical signal to the set-time-of-day device 158. The set-time-of-day device 158 in turn supplies an enabling electrical signal to the time-of-day-clock-counter 162 and enables the time-of-day-clock-counter 162 to receive the time-of-day portion of the digital message stored in shift register 156. Once the selected time-of-day is received by the time-of-day-clock-counter 162, the crystal oscillator 163 maintains such time-of-day current.

If the type message being transmitted is a command for the seismic energy means to produce its first shot at a selected future instant of time and a command for each of the various geophone monitoring means to commence, at the same selected future instant of time, sampling and storing the electrical signals produced by the geophones responsive to such shot, the instruction-decoder 157 supplies an electrical signal to the time-of-first-shot device 159. The time-of-first-shot device 159 in turn supplies an enabling electrical signal to the time-of-shot-storage device 164 and enables it to receive from the shift register 156 the future time-of-day component of the digital message stored therein. The outputs of the time-of-day-clock-counter 162 and time-of-shot-storage device 164 are coupled to the inputs of a comparator 165. Once the time-of-day-clock-counter 162 is generating a digital signal indicative of the current time-of-day and the time-of-shot-storage device 164 has been loaded with the selected future time-of-day for the next shot, the comparator 165 compares the current time-of-day signal generated by the time-of-day-clock-counter 162 with the signal generated by the time-of-shot storage device 164 indicative of the selected future time-of-day for the next shot. When these two times are identical, comparator 165 generates an impulse enabling a record-length-counter device 166 and resetting it to a zero count.

Associated with the geophone monitoring means 14 is a switch 167 for inputting data representative of the preselected period of time the geophone monitoring means 14 will sample the electrical signal generated by the geophones 13 responsive to each shot. The record-length switch 167 supplies an electrical signal to a record-length-comparator 168 representative of the preselected time period for which the geophone monitoring means shall sample the geophone signal. When it is enabled, the record-length-counter 166 supplies a counting signal from the oscillator 163 to the record-length-comparator 168. The record-length-comparator 168 compares such signals and when the record-length-counter 166 has counted for the selected period of time, the record-length-comparator 168 disables the record-length-counter 166. During the time period the record-length-counter 166 is enabled, the clocking signal supplied thereto from the oscillator 163 is supplied therethrough to a summing control means 71 which times the sampling, digitizing and storing of the data received from the geophones 13 responsive to the shot. The clocking signal supplied through the record-length-counter to the summing control means 71, preferably is provided by the oscillator 163; it could, however, be provided by the time-of-day-clock-counter 162. The summing control means preferably comprises a series of one-shot means 91–97 such as have been previously described with respect to FIG. 7.

The output of the record length counter is also coupled to a number-of-shots counter 169 which functions to maintain a continuous count of the number of times the record-length-comparator 168 is enabled by the record-length-counter 166, which gives a count of the number of times the geophone monitoring means samples and stores data responsive to a shot produced by the seismic energy source.

Similar to the description of the geophone monitoring means 14 illustrated in FIG. 6, the electrical signal generated by the associated geophones is supplied to the geophone monitoring means over line 15. The electrical signal is amplified by variable gain amplifier 80 and, responsive to enabling signals supplied from the summing control means 71, the amplified signal is sampled by the sample-and-hold-device 81, the sampled signal is transduced into digitized form by the analog-to-digital converter 82, and the magnitude of the digital data generated by the analog-to-digital converter 82 is altered by the up/down shift register 84. The output of the up/down shift register 84 is coupled to an adder 85. The adder 85 is coupled to a memory means 76.

Coupled to the memory means 76 is a disabling signal generated by the time-of-first-shot device 159 which disables the memory means 76 so that the incoming data generated by the geophones responsive to the first shot of the seismic energy source is summed with a digital word of zero value and then accessed into the memory means 76.

Associated with the memory means 76 are a memory write control 87 and a memory read control 88 which, responsive to enabling signals from the summing control means 71, access the data from the adder into the memory device in a manner well known to those skilled in the art in view of the description of the memory device 76, the memory write control 87 and the memory read control 88 provided in FIGS. 9 and 10.

If the type message transmitted by the operator of the system is a command for the seismic energy source to produce its next shot at another selected future time-of-day and a command for each of the various geophone monitoring means to commence, at such selected future-time-of-day, sampling the electrical signal generated by the associated geophones responsive to such shot, summing such sampled data with previously stored data, and storing the summed data, then the instruction-decoder 157 supplies an electrical signal to time-of-next-shot device 160. The time-of-next-shot device 160 in turn supplies an enabling electrical signal to the time-of-shot-storage device 164 and enables it to receive the future time-of-day component of the digital message stored in the shift register 156. The operation of the components of the geophone monitoring means then is as previously described with respect to the time of first shot command, except no disabling signal is supplied to the memory means 76 and thus the adder is allowed to sum the data received from the up/down shift register 84 with the data previously stored in the memory means 76. As such, the adder 85, the memory means 76, the memory write control 87 and the memory read control 88 function responsive to enabling signals from the summing control means 71, to sum or stack the incoming data from the up/down shift register 84 with the data previously stored in the memory means 76 and to access such summed data back to the memory means 76.

If the type message transmitted by the operator of the system is a command for the various geophone monitoring means to commence accessing the summed data from the memory means 76 to the recording device 89 at a selected future time-of-day, then the instruction decoder 157 supplies an electrical signal to the write-sum device 161. The write-sum device 161 in turn supplies an enabling electrical signal time-of-shot-storage device 164 and enables it to receive the future time-of-day component of the digital message stored in the shift register 156. When the comparator 165 determines that the current time-of-day equals the selected future time-of-day, the comparator supplies an electrical impulse to the record-length-counter 166 which enables it and resets it to a zero count. During the time the record-length-counter 166 remains enabled, the clocking signal generated by the oscillator 163 is coupled through the record-length-counter 166 to the summing control means 71.

The electrical signal generated by the write-sum device 161 is also supplied to the input of the number-of-shots counter 164, to the recorder means 89, and, to the memory-write-control 87, and to a data multiplexer 170. The electrical signal generated by the write-sum device 161 and supplied to the recorder means 89, commences the operation of the recorder means 89. The electrical signal generated by the write-sum device 161 and supplied to the memory-write-control 87 disables the memory-write-control control 87 whereby any data received by the adder from the up/down shift register 84 is not written into the memory. The memory means 76 and the memory-read-control 88 function, responsive to enabling signals from the summing control means 71, to commence reading the summed data out of the memory means 76 and transferring such data to the data multiplexer 170. The data multiplexer 170 transfers to the recording means 89 bit by bit the summed data supplied to it from the memory means. The data multiplexer 170 also transfers to the recording means 89 bit by bit the data stored in the number-of-shots counter 169 representative of the number of shots, the data stored in the set-record-length switches 167 representative of the record length, and the data stored in the location switches 171 indicative of the location of the geophone monitoring means, the latter data being input by the person who implaces the geophone monitoring means.

The following is a preferable manufacturer and part numbers list for the components described in the geophone monitoring means utilized in the second embodiment of the invention and not previously described in this or the first embodiment:

| | |
|---|---|
| Clock Counter 155 | DM 74197 |
| Shift Register 156 | DM 74194 |
| Instruction decoder 157 | DM 7430 |
| Set-time-of-day device 158, Time-of-first-shot device 159, Time-of-next-shot device 160, and write-sum device 161 | AM 9602 |
| Crystal oscillator 163 | Bulova PCOXO-5 |
| Time-of-shot storage 164 | DM 74174 |
| Comparator 165, and record-length-comparator 168 | DM 7485 |
| Record-length-counter 166 | DM 74196 |
| Record-length-switch 167 | EECO 2-177606 |
| Number-of-shots-counter 169 | DM 74196 |
| Location switches 171 | EECO 4-177606 |

FIG. 13 illustrates a preferred seismic energy source for the second embodiment of the invention. The electromagnetic signals generated by the control means are detected by antenna 40 and supplied to receiver 41. The output of receiver 41 is coupled to the input of a tone detector 154. Tone detector 154 detects the stream of audible tones supplied to its input and generates a digital data stream representative thereof. The output of the tone detector 154 is coupled to the input of a clock-counter 155 which functions to count the bits in the decoded signal to insure that the message length and the rate of the message is correct. The digital signal is coupled from the clock-counter 155 into a shift register 156 and temporarily stored therein. If the clock-counter 155 determines that the message length and the rate of the message is correct, it generates an enabling electrical signal to the instruction-decoder 157. The instruction-decoder 157 is then enabled to receive the first 4 bits in the message from the shift register 156. The instruction-decoder 157 examines the first four bits to determine what type of message has been transmitted. Depending upon the type of message transmitted, the instruction-decoder 157 emits an electrical signal either to the set-time-of-day device 158, the time-of-first-shot device 159, or the time-of-next-shot device 160.

If the type of message is the command for the internal clocking means to synchronize with a selected time-of-day, the instruction-decoder 157 supplies an electrical signal to the set-time-of-day device 158. The set-time-of-day device in turn supplies an enabling electrical signal to the time-of-day-clock-counter 162 which enables the time-of-day-clock-counter 162 to receive the time-of-day portion of the digital message stored in the shift register 156. Once the selected, current time-of-day is stored in the time-of-day-clock-counter 162, the crystal oscillator 163 maintains such time of day current.

If the type of message is a command for the seismic energy means to produce its first shot at a selected future instant of time and a command for the various geophone monitoring means to commence sampling and storing the electrical signal produced by the geophones responsive to such shot at such future selected instant of time, the instruction-decoder 157 will generate an electrical signal to the time-of-first-shot device 159. The time-of-first-shot device 159 generates an enabling electrical signal to the time-of-shot-storage device 164 and enables it to receive from the shift register 156 the future time-of-day component of the digital message stored therein. The comparator 165 compares the current time-of-day signal generated by the time-of-day for the first shot stored in the time-of-shot-storage device 154. When the two times are identical, comparator 165 generates an impulse over line 44 enabling the firing mechanism 45 and causing the energy means 46 to produce a shot.

If the type of message transmitted by the operator of the system is a command for the seismic energy source to produce its next shot at a future selected time of day and command for the various geophone monitoring means to commence, at such selected future time of day, sampling the electrical signal generated by the associated geophones responsive to such shot, summing such sample data with previously stored data, and storing the summed data, then the instruction-decoder 157 supplies an electrical signal to the time-of-next-shot device 160. The time-of-next-shot device 160 in turn supplies an enabling signal to the time-of-shot-storage device 164 enabling it to receive the selected future time-of-day component of the digital message stored in the shift register 156. Again, the comparator 165 compares the current time-of-day signal generated by the time-of-day-clock-counter 162 with the selected future time-of-day for the next shot stored in the time-of-shot-storage device 164. When the two times are identical, the comparator 165 generates an impulse over line 44 enabling the firing mechanism 45 and causing the energy means 46 to produce a shot.

If the type message is a command for the various geophone monitoring means to make a record of the summed data, the seismic energy source will receive such electrical signal but will take no action because the instruction-decoder 157 will not generate an electrical signal to any other component of the seismic energy source.

Figure 14:
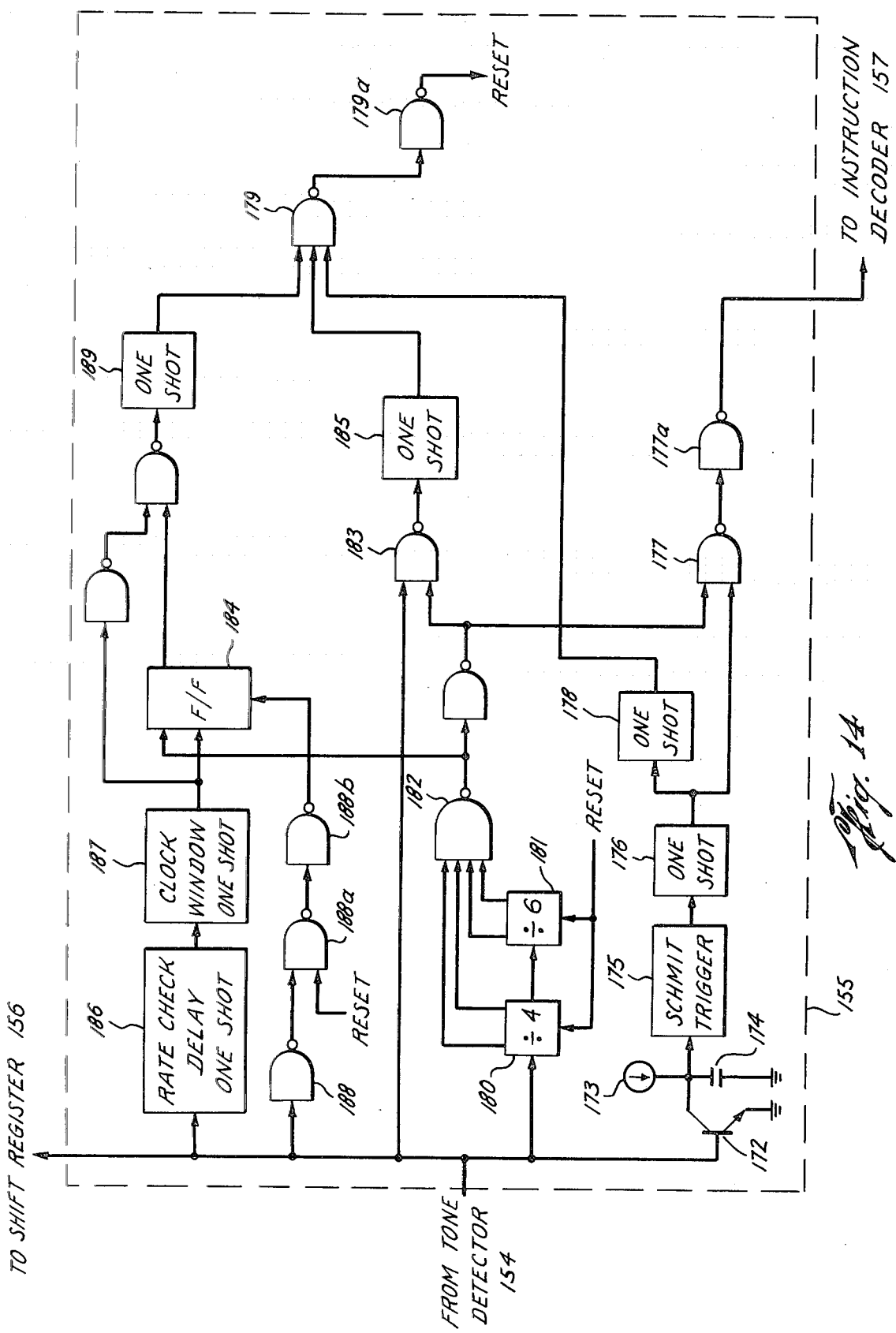
FIG. 14 is a partial schematic and partial block diagram of the preferred electrical components of the clock counter utilized in the seismic energy source and in the geophone monitoring means in the second embodiment of this invention.

FIG. 14 illustrates the preferred components of the clock counter 155 utilized in the various geophone monitoring means and the seismic energy source in this second embodiment of the seismic geophysical system according to this invention. The digital data stream generated by the tone detector 154 is supplied to a transistor 172. The output of the transistor 172 is coupled, along with the output of a constant current generator 173, to a capacitance 174 and to a Schmidt trigger 175. The transistor 172 shorts out the capacitance 174 every time a data pulse is received by the transistor. When data pulses are no longer being received by the transistor, the Schmitt trigger 175 fires and the one-shot 176 generates an end-of-clock signal which is supplied to NAND gate 177. The end-of-clock signal is also supplied to one-shot 178, and after a selected time duration, one-shot 178 supplies an electrical signal to gate 179.

The digital data stream is also supplied to a divide-by-four counter 180 and its output is supplied to a divide-by-six counter 181. The outputs of the counters 180 and 181 are coupled to a gate 182 which detects a count of 24. When gate 182 detects a count of 24, it generates an electrical signal which supplied to gate 177, to a gate 183, and to a flip-flop 184. When the electrical signal generated by the gate 182 is gated by gate 177 with the signal generated by one-shot 176, gate 177 causes gate 177a to generate an enabling impulse signal which is supplied to the instruction decoder 157.

The digital data stream generated by the tone detector 154 is also coupled to the gate 183. If more than 24 data pulses are generated by the tone detector 154, gate 183 generates an electrical signal which causes one shot 185 to supply an electrical signal to gate 179.

The digital data stream generated by the tone detector 154 is also coupled to a rate check delay one-shot 186. Each time a data pulse is received by one-shot 186, a disabling electrical signal is generated by the one-shot 186 having a duration a finite amount of time shorter than the time period between data pulses. When the clock window one-shot 187 is not disabled by the signal from the one-shot 186, the output of clock window one-shot 187 toggles the flip-flop 184 so that its Q output is at a high logic level. If another data pulse is generated by the tone detector 154 and coupled to the flip-flop 184 through gates 188, 188a and 188b, within the time period of the clock window one-shot 187, the Q output of flip-flop goes to a low logic level. If no data pulse is generated by the tone detector within the time period of one-shot 187, one-shot 189 generates a pulse to gate 179.

Whenever gate 179 receives an electrical impulse from any of one-shots 178, 185 or 189, gate 179 causes gate 179a to generate a reset signal which resets the various components of the clock counter 155 and thus prevents gates 177 and 177a from generating an enabling pulse to the instruction decoder 157.

Thus the clock counter examines the incoming digital data stream to determine if its message length and rate of message are correct.

In the operation of this second embodiment of the seismic geophysical exploration system according to this invention, each of the geophone monitoring means 14 and each of the associated geophones is placed in its desired physical locations. As each geophone monitoring means 14 is placed in position and connected to the geophones in the associated set, the person implacing the geophone monitoring means activates the power (not shown) for the geophone monitoring means 14, operates the location switches 171 to input therein information representative of the physical location of the geophone monitoring means, and operates the record length switches 167 to input therein information representative of the period of time the geophone monitoring means is to sample the geophone electrical signal responsive to each shot by the seismic energy source.

The seismic energy source 12 is implaced in its desired location and the power (not shown) for such seismic energy source is activated.

The operator of the system then manipulates the time of day switches 121, 122 and 123 and the transmit-time-of-day switch 130 associated with the encoder 20 in the control means, to cause transmitter 22 to generate an electromagnetic signal over antenna 23 carrying data representative of a command for the internal clocking devices in the remote units to synchronize with a selected time-of-day. The electromagnetic signal is received by the seismic energy source and the various geophone monitoring means, and checked by the clock counter 155 to see that its message length and rate of message are correct. If correctly received, the selected time-of-day is stored in the time-of-day-clock-counter 162 in the seismic energy source and each of the geophone monitoring means and is maintained current by the crystal oscillator 163. Thus, the internal clocking systems in the seismic energy source and each of the geophone monitoring means, are synchronized together. To insure proper synchronization, the operator of the system can repeatedly send updated time-of-day information to the seismic energy source and the various geophone monitoring means.

Once the operator wishes the seismic energy source to produce its first shot, the operator of the system selects a future instant of time at which the shot will be produced and manipulates the time-of-shot switches 144, 145 and 146 and the transmit-time-of-first-shot switch 141 associated with the encoder 20 in the control means. As a result, an electromagnetic signal is generated by the control means containing data commanding the seismic energy source and the various geophone monitoring means that a "time of first shot" message is being transmitted and stating the future time-of-day of the first shot.

The electromagnetic signal carrying the data representative of the time of the first shot is received by the receiver 41 in the seismic energy source 12, and checked by the clock counter 155. If the message length and rate of message are correct, the time of the first shot is stored in the time-of-shot storage 164. Likewise, the electromagnetic signal containing the coded data representative of the time of the first shot is also received by the various geophone monitoring means, checked by the clock counter 155, and stored in the time-of-shot storage 164.

When the current time-of-day signal generated by the time-of-day-clock-counter 162 in the seismic energy source and each of the geophone monitoring means matches the selected time for the first shot stored in the time-of-shot storage device 164, the comparator 165 in the seismic energy source and in each of the geophone monitoring means generates an electrical signal. Such electrical signal generated by the comparator 165 in the seismic energy source 12 is coupled to the firing mechanism 45 and causes the energy source 46 to produce a shot. The electrical signal generator by the comparator 165 in each of the geophone monitoring means enables the record-length-counter 166, which in turn supplies the internal clocking signal to the summing control means 71, which in turn provides enabling signals to various components of the geophone monitoring means to time the sampling of the electrical signal generated by the geophones responsive to such shot, the digitizing of such sampled signals, and the storing of the digitized data in the memory device 76. This sampling, digitizing and storing operation continues for the preselected period of time input into the record-length-switch 167 by the person who implaces the geophone monitoring means.

When the operator of the system desires the seismic energy source to produce its next shot and the various geophone monitoring means to sample, sum and store the data received from the geophones responsive to such shot, the operator of the system selects a future time-of-day in which these operations will occur and manipulates the time-of-shot switches 144, 145 and 146 and the transmit-time-of-next-shot switch 147 associated with the encoder 20 in the control means. This causes the control means to generate and transmit an electromagnetic signal carrying coded data instructing the seismic energy source and the various geophone monitoring means that a "time of next shot" message is being transmitted and stating the selected time-of-day the next shot will occur.

This electromagnetic signal is received by the seismic energy source and the various geophone monitoring means. If the message length and rate of message are correctly received, the time of the next shot is stored in the time-of-shot storage device 164 in the seismic energy source and each of the various geophone monitoring means. When the current time-of-day generated by the time-of-day-clock-counter 162 equals the stored time-of-day in the time-of-shot storage device 164, the comparator 165 generates a representative electrical signal. This causes the seismic energy source to produce a shot and causes the various geophone monitoring means to commence sampling the electrical signals generated by the associated geophones responsive to such shot, digitizing the sampled signals, summing such digitized data with the data already stored in the memory means 76, and accessing the summed data to the memory means 76 for storage. The operation of the geophone monitoring means again continues for the period of time set in the record-length switch 176.

After a selected number of shots have been produced by the seismic energy source and the electrical signals generated by the geophones responsive to such shots have been summed or stacked in the memory means 76, the operator of the system may elect to transmit an electromagnetic signal to the various geophone monitoring means commanding the memory device 76 to play out its contents onto the recorder means 89 in order that a record may be made thereof. This is accomplished by the operator of the system selecting a future time-of-day at which this operation will commence, and manipulating the time-of-shot switches 144, 145 and 146 and the transmit-write-sum switch 149 associated with the encoder 20 in the control means. As a result, the control means generates an electromagnetic signal containing coded data instructing the seismic energy source and the various geophone monitoring means that a write-sum message is being transmitted and stating the time-of-day at which this operation will commence. This electromagnetic signal is received by the seismic energy source but no action is taken since the seismic energy source does not contain a write-sum device 161. This electromagnetic signal is received by each of the geophone monitoring means and the write-sum device 161 therein enables the number-of-shots-counter 169, the recorder means 89, the data multiplexer 170, and the memory-write-control device 87. The summed data in the memory means 76 is transmitted to the data multiplexer 170 and written one bit at a time onto the recorder means 89.

At this point, the operation of the system may cease or the operator of the system may cause the seismic energy source to produce another series of shots and another record to be made on the recording means of the summed data. When the operation of the system is complete, the operator manually collects the records, tapes or the like from the recording means 89 in the various geophone monitoring means. The tapes are played out sequentially through a mini-computer and put on a standard multitrack tape in a manner that is well known to those skilled in the art. Since the time in which each shot was produced is fully identified, the records may be properly put together in the usual manner in the main computer.

By being able to chose a future selected instant of time for the seismic energy source and/or the geophone monitoring means to perform an operation, such as the seismic energy source producing a shot or the various geophone monitoring means commencing sampling and storing the signal produced by the geophones responsive to such shot, the operator of the system may choose a future time-of-day sufficiently distant from the current time-of-day to allow him to transmit repeatedly the electromagnetic signal carrying the data representative of the time at which the operation is to be performed. The clock counter 155 will not enable the instruction decoder 157 if the message length or rate of message is incorrect. This diminishes the chance of the electromagnetic signal being erroneously received or not received at all by the seismic energy source or one of the various geophone monitoring means.

Thus, the second embodiment of the improved seismic geophysical exploration system according to this invention provides a geophone monitoring means which is positioned in relative close proximity to and coupled with one or more geophones. A control means generates an electromagnetic signal containing data which initiates the operation of the seismic energy source and the various geophone monitoring means. Preferably, the initial electromagnetic signal generated by the control means contains data synchronizing internal clocking devices in the seismic energy source and the various geophone monitoring means to a selected time-of-day. Thereafter, preferably the electromagnetic signal contains data commanding certain preselected operations of the seismic energy source and/or the various geophone monitoring means to commence at a selected future time-of-day, which selected future time-of-day is based on the synchronized internal clocking devices of the seismic energy source and the various geophone monitoring means. The internal clocking device in the seismic energy source and each of the geophone monitoring means clocks the operation of the internal components of the seismic energy source and each of the geophone monitoring means, and thus there is no need for the remotely located control means to generate and transmit a continuous, accurate clocking signal. Each of the geophone monitoring means receives, samples, sums, stores, and ultimately records data representative of the returning seismic waves sensed by the associated geophones.

C. Embodiment in which seismic energy source and geophone monitoring means commence preselected operations at selected future instants of time in accordance with preselected internal programs.

In the second embodiment of this invention (described in Section B hereof), it is preferable that the control means generates electromagnetic signals containing data commanding the seismic energy source and the various geophone monitoring means to perform preselected operations at selected future instants of time, the timing for such operations being provided by internal clocking devices which have been previously synchronized by electromagnetic signals generated by the control means. In the third embodiment of the seismic geophysical exploration system according to this invention, a control means 16 is utilized by the operator of the system to initiate the operation of the seismic energy source 12 and the geophone monitoring means 14. The control means initiates the operation of the seismic energy source and the geophone monitoring means by generating electrical signals which synchronize the internal clocking devices in such components. Thereafter, the seismic energy source 12 and each of the geophone monitoring means 14 perform preselected operations in accordance with preselected internal programs, the timing for such operations being provided by the internal clocking devices.

In this third embodiment of the seismic geophysical exploration system according to this invention, a seismic energy source 12, a plurality of geophones 13, and a plurality of geophone monitoring means 14 associated with selected of the geophones, are utilized as described with respect to FIG. 1. A control means 16 is utilized by the operator of the system to initiate the operation of seismic energy source 12 and the various geophone monitoring means 14. The control means 16 may be electrically connected to the seismic energy source and the various geophone monitoring means through cables or conductors, and the electrical signals generated by the control means may be coupled to such units through such conductors. Preferably, however, the electrical signals generated by the control means are transmitted to the seismic energy source and the various geophone monitoring means in the form of electromagnetic signals. The remainder of the description of this third embodiment of the invention will assume that the electrical signals of the control means are being transmitted in the form of electromagnetic signals. Similarly to the control means 16 described with respect to the first embodiment of the invention and illustrated in FIG. 2, the control means 16 utilized with the third embodiment of the invention preferably includes certain manual controls, an encoder 20, a transmitter 22, and an antenna 23. Preferably the encoder 20 functions to receive the electrical signals input to it by the operator of the system through the manual controls and to generate a representative serial stream of audible tones having frequency $f_1$ or $f_2$, which stream of audible tones is transmitted by transmitter 22 to the seismic energy source and the various geophone monitoring means. The transmitter 22 and the antenna 23 preferably are as described with respect to FIG. 2. The preferred components of the manual controls and the encoder 20 of the control means 16 in this third embodiment of the invention, are illustrated in FIG. 15.

Figure 15:
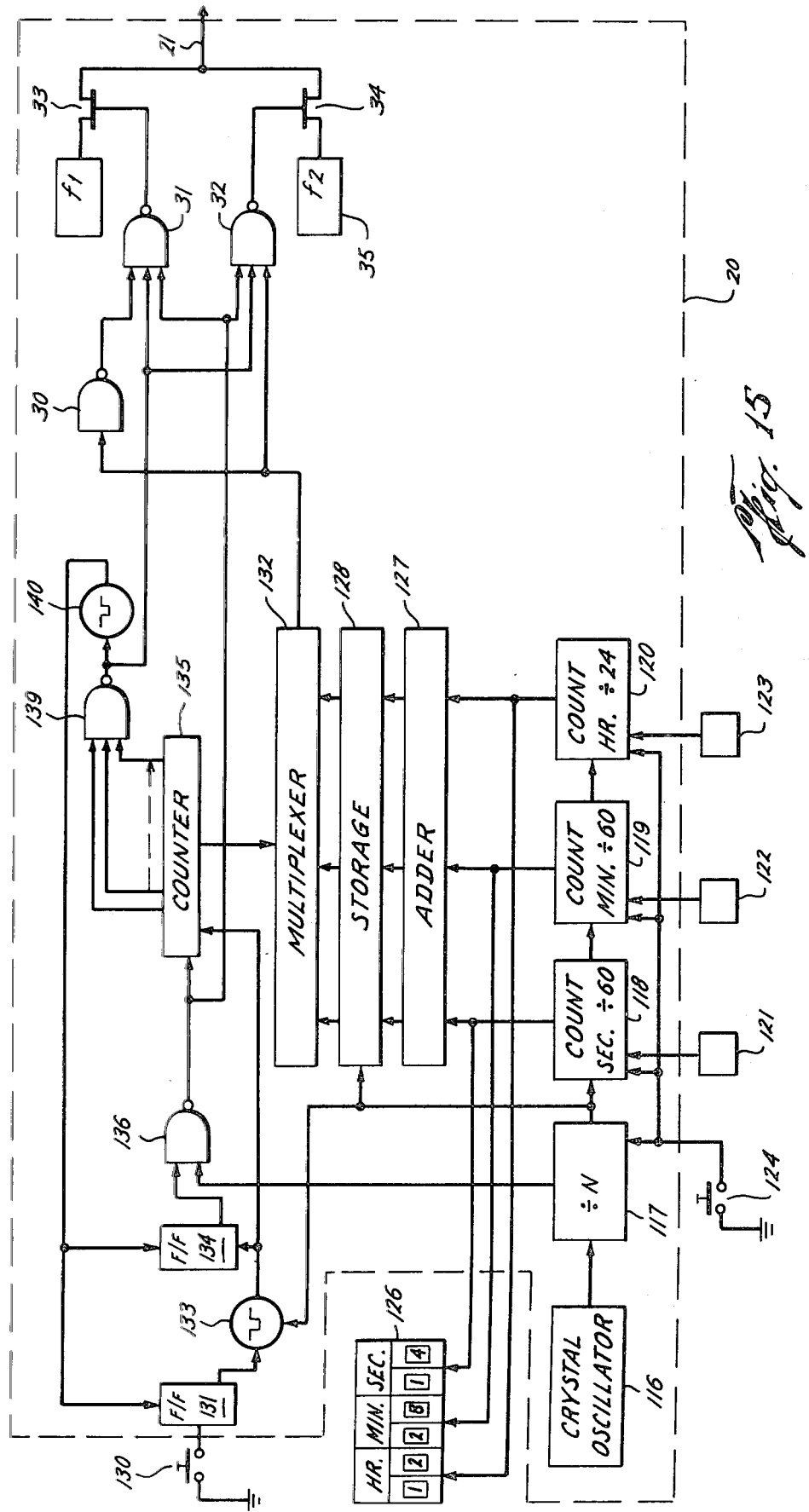
FIG. 15 is a partial schematic and partial block diagram of the preferred electrical components of the manual controls and encoder in the third embodiment of this invention.

Referring to FIG. 15, in third embodiment of the invention it is preferable that the operator of the system can cause the control means 16 to generate a serial stream of audible tones indicative of a selected time-of-day. Similarly to the encoder described previously with respect to FIGS. 11A and 11B, the encoder 20 generates time-of-day information by counting down thhe frequency output of a highly precise, low-drift crystal oscillator 116 through the use of a divide-by-N counter 117, a seconds-counter 118, a minutes-counter 119, and an hours-counter 120. The operator of the system sets the selected initial time-of-day data into the various counters in the clock system of the encoder by manipulating the manual switches 121, 122, and 123 and then depresses the set-time switch 124. Once the operator of the system inputs the desired initial time-of-day the clock system in the encoder 20 continuously generates electrical signals in digital format indicative of the current time-of-day. The current time-of-day data is continually displayed on an indicator 126 located in the control means 16.

As previously described with respect to FIGS. 11A and 11B, since the encoder 20 requires a finite period of time in which to transmit the digital time-of-day signals, it is preferable that the digital "word" generated by the clock system always be the current time-of-day plus a selected increment of time. Thus, the output of the clock system is supplied to an adder 127, which adds thereto a selected increment of time. The output of the adder 127 is coupled to the input of a storage register 128 which stores therein the digital word indicative of the current time-of-day plus the selected increment of time.

As will hereinafter be explained, in this third embodiment of the seismic geophysical exploration system according to this invention, the seismic energy sources and each of the various geophone monitoring means includes an internal clocking device which is synchronized to the current time-of-day by the electromagnetic signals generated by the control means. Similarly to the encoder described with respect to FIG. 11A and 11B, when the operator of the system wishes to transmit electromagnetic signals containing data indicative of the current time-of-day and thereby synchronize the clocking devices in the seismic energy source and various geophone monitoring means, he depresses transmit-time-of-day switch 130. Depressing switch 130 causes flip-flop 131 to reset and the output of the flip-flop 131 to assume a selected logic level. The selected logic level output by flip-flop 131 is coupled to pulse generator 133, which generates an electrical pulse synchronous in time with the loading of storage register 128 that is supplied to flip-flop 134 and counter 135, presetting the gating flip-flop 134 and resetting the counter 135. When the gating flip-flop 134 is preset, it generates an electrical signal enabling gate 136 to couple the clock signal from the divide-by-N counter 117 to the counter 135. It is preferable that the serial stream of audible tones generated by encoder 20 comprise 20 bits in this third embodiment of the invention; therefore, counter 135 preferably functions to count from 0 to 19. The output of the counter 135 is coupled to the input of the multiplexer 132 and functions to time the operation of the multiplexer 132. The multiplexer 132 functions to generate an electrical signal containing a serial stream of logic levels indicative of the parallel digital word supplied to the multiplexer from the storage register 128.

The count generated by counter 135 is also coupled to the gate of 139. When gate 139 detects a count of twenty, it energizes pulse generator 140, which generates a pulse of short duration. The output from pulse generator 140 is coupled to flip-flop 131 and flip-flop 134. When the pulse generated by pulse generator 140 is applied to such flip-flops, flip-flop 131 is reset and flip-flop 134 is preset. Resetting and presetting flip-flops 131 and 134 causes the logic level of their outputs to change, thereby altering the condition of gate 136 such that the clock signal is no longer input to counter 135.

The output of the multiplexer 132 is supplied to a network comprising gates 30, 31 and 32 field effect switches 33 and 34, and tone generators 35 and 36, such as have been previously described with respect to FIG. 3. Depending upon the logic level of the output of the multiplexer 132, either frequency $f_1$ or $f_2$ of the tone generators 35 and 36 will be supplied over line 21 to the transmitter 22. The serial stream of tones supplies over line 21 to the transmitter 22 will be representative of the selected current time-of-day plus the increment of time added by adder 127.

Figure 16A:
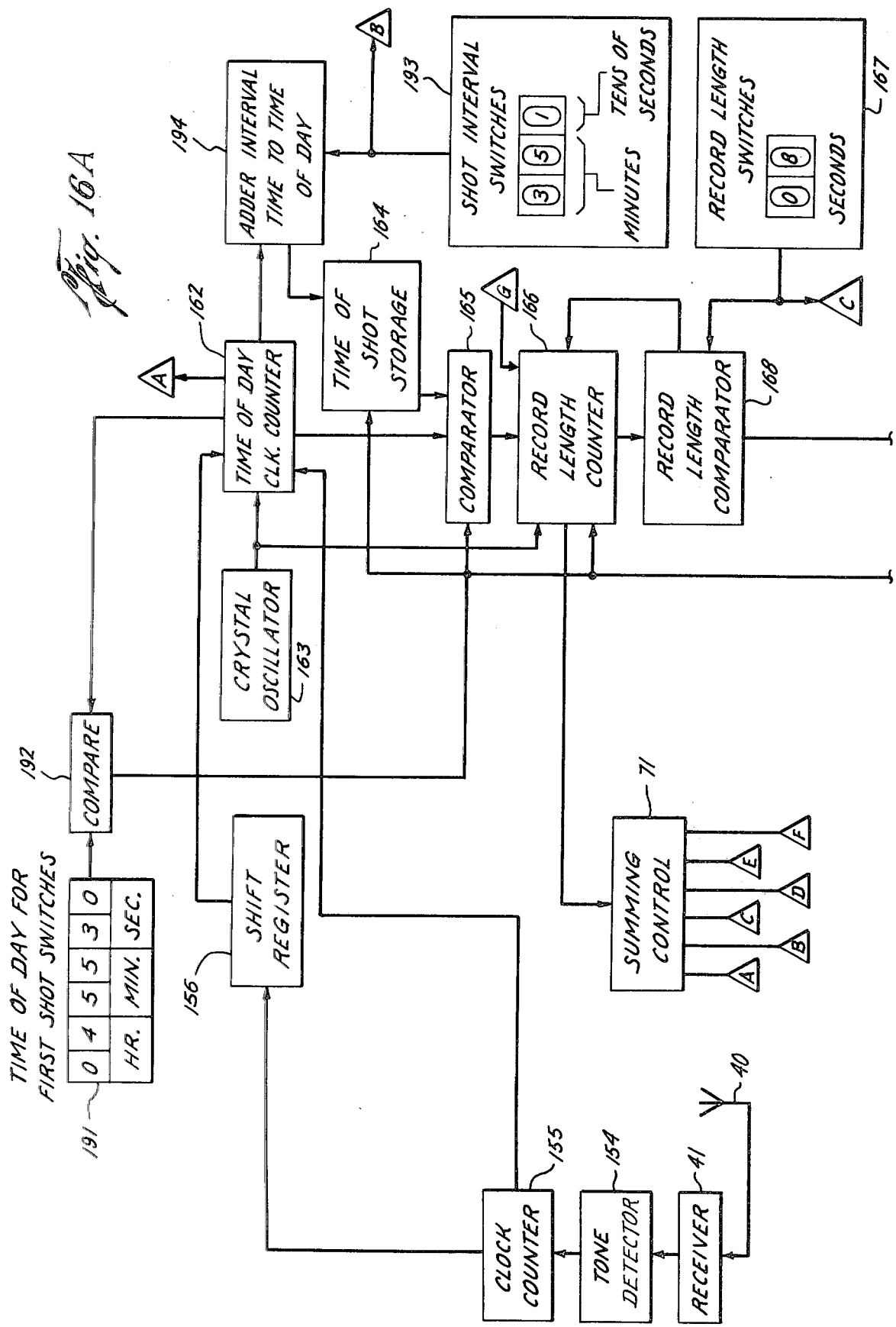
FIGS. 16A and 16B are a partial schematic and partial block diagram of the electrical components of the geophone monitoring means in the third embodiment of this invention.
Figure 16B:
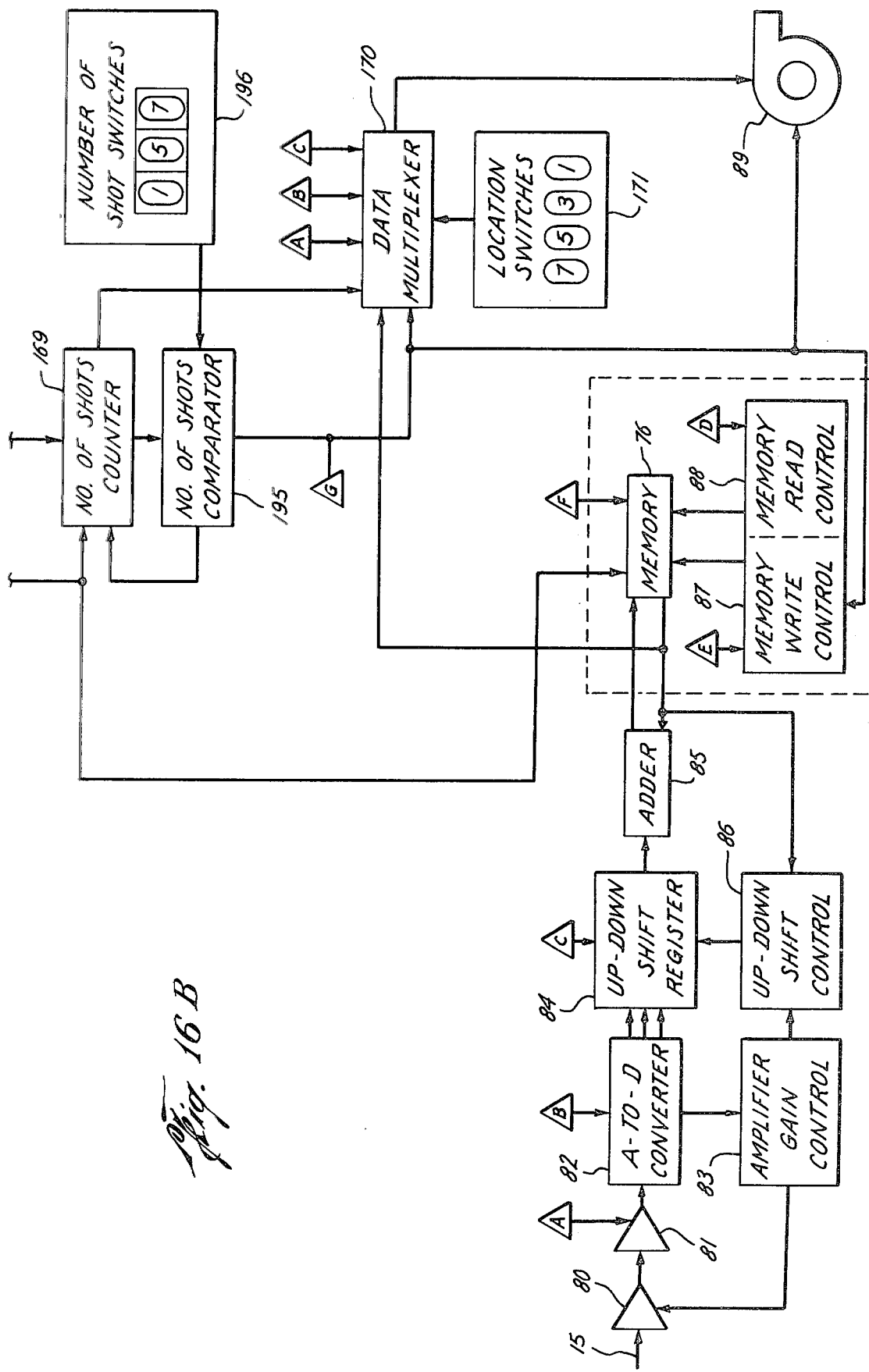

A preferred geophone monitoring means for this third embodiment of the invention is illustrated in FIGS. 16A and 16B. The electromagnetic signals generated by the control means are detected by antenna 40 and receiver 41. The output of receiver 41 is coupled to the input of tone detector 154. As previously described with respect to FIGS. 12A and 12B, tone detector 154 transduces the stream of audible tones supplied to its input into a stream of digital pulses. The output of the tone detector 154 is supplied to a clock-counter 155, such as has been previously described with respect to FIG. 14, which functions to determine if the message length and rate of message is correct. Since the electromagnetic signal generated by the control means in this third embodiment of the invention preferably contains twenty digital pulses, the components of the clock-counter 155 described in FIG. 14 should be altered somewhat to check for a signal having only twenty data pulses. The entire digital signal is coupled from the clock-counter 155 into a shift register 156 and temporarily stored therein. If the message length and rate of message are correct, the clock-counter 155 generates an enabling signal (in the second embodiment of this invention, such enabling signal was supplied to an instruction decoder 157) enabling the time-of-day-clock-counter 162 to receive the digital signal stored in the shift register 156. In this third embodiment of the invention, the message component of the signal stored in the shift register 156 will be the selected time-of-day. Once the selected time-of-day is stored in the time-of-day-clock-counter 162, the crystal oscillator 163 maintains such time-of-day current.

Associated with the geophone monitoring means are switches 191 for inputting data representative of the selected future time-of-day for the first shot. The data input through such switches 191 is compared by a comparator 192 with the current time-of-day data generated by the time-of-day-clock-counter 162. When the comparator 192 determines that the data stored in the switches 191 equals the current time-of-day, it generates an electrical signal which is supplied to the time-of-shot-storage device 164, the comparator 165, the record-length-counter 166, the number-of-shots-counter 169, and the memory means 76. Also associated with the geophone monitoring means are switches 167 for inputting data representative of the period of time the geophone monitoring means will continue to receive, sample and store the electrical signals generated by the associated geophones responsive to each shot. Once the record-length-counter 166 is enabled, it remains enabled for the preselected period of time set in the record-length switches 167 by the person who emplaces the geophone monitoring means in position.

Associated with the geophone monitoring means are switches 193 for inputting data representative of a preselected interval of time between shots. The output of the shot-interval switches 193 is coupled to the input of an adder 194. Also coupled to the adder 194 is the output of the time-of-day-clock-counter 162. The adder 194 functions to add the interval of time stored in the shot-interval switches 193 to the current time-of-day generated by the time-of-day-clock-counter 162. The output of the adder 194 is supplied to the input of the time-of-shot-storage device 164. At the instant the time-of-shot-storage device 164 is enabled by the impulse signal from the comparator 192, the electrical signal supplied thereto by the adder 194 (representative of the current time-of-day plus the preselected interval of the time between shots) is "frozen" in the time-of-shot-storage device 164, and is supplied by the time-of-shot-storage device 164 to the comparator 165. The comparator 165 compares the current time-of-day generated by the time-of-day-clock-counter 162 with the time-of-day stored in the time-of-shot-storage device 164, and when the two times are equal, generates an enabling electrical signal to the record-length-counter 166. Once the record-length-counter 166 is enabled, it remains enabled for the preselected period of time set in the set-record-length switches 167.

Similar to the description of the geophone monitoring means illustrated in FIGS. 12A and 12B, the electrical signals generated by the geophones are combined together and supplied over line 15 to a variable gain amplifier 80. The output of the amplifier 80 is supplied to the input of a sample-and-hold device 81. The output of the sample-and-hold device 81 is supplied to the input of an analog-to-digital converter 82. The output of the analog-to-digital converter 82 is supplied to the input of up/down shift register 84. The output of the up/down shift register 84 is supplied to the input of an adder 85. Electrically coupled to the adder 85 is a memory device 76. A write-memory-control 87 and a read-memory-control 88 function to access data back and forth between the adder 85 and the memory 76 responsive to enabling signals from the summing control means 71.

If the record-length-counter 166 is enabled by an enabling signal from the comparator 192, the clocking signal generated by the crystal oscillator 163 is supplied through the record-length-counter 166 to the summing control means 71 and enabling signals are generated by the summing control means 71 to the sample-and-hold device 81, the analog-to-digital converter 82, the up/down shift register 84, the memory means 76, the memory write control 87 and the memory read control 88, so that the electrical signal generated by the associated geophones is sampled, digitized and stored in the memory device 76. The memory means 76 is disabled by the signal from the comparator 192 whereby the adder 85 sums the sampled and digitized data with only a digital word of zero value.

When the record-length-counter 166 is enabled by an enabling signal from the comparator 165, the clocking signal generated by the oscillator 163 is supplied to the summing control means 71 and enabling signals are generated by the summing control means 71 to the sample-and-hold device 81, the analog-to-digital converter 82, the up/down shift register 84, the memory means 76, memory write control 87 and the memory read control 88, whereby the electrical signal generated by the associated geophones is sampled, digitized, summed with the data previously stored in the memory means 76, and the summed data accessed again to the memory means 76.

Also associated with the geophone monitoring means are switches 196 for inputting data representative of the number of shots with respect to which the geophone monitoring means is to receive and store data. Each time the record-length-counter is enabled, an impulse is transmitted from the record-length-comparator 168 to a number-of-shots counter 169. A number-of-shots comparator 195 compares the number of shots recorded by the number-of-shots-counter 169 with the preselected number of shots set in the number-of-shots switches 196. When the two numbers are equal, the number-of-shots-comparator 195 generates an electrical signal which is supplied to the recording means 89 to commence its operation, to the record-length-counter 166 to enable it, to the data multiplexer 170 to enable it, and to the memory-write-control 87 to disable it. The memory-read-control 88 reads the summed data stored in the memory means 76 into the data multiplexer 170. Also transferred to the data multiplexer 170 is the current time-of-day generated by the time-of-day-clock-counter 162, the time interval between shots stored in the shot-interval switches 193, the preselected record length increment of time stored in the record-length switches 167, the number of shots stored in a number-of-shots-counter 169, and the data indicative of the location of the geophone monitoring means stored in the location switches 171. The data multiplexer 170 transfers to the recording means 89 bit by bit the data accessed thereto. The recording means 89 makes a record of such data.

The following is a preferable manufacturer and parts number list for the components described in the geophone monitoring means utilized in the third embodiment of the invention and not previously described in this or the first or second embodiments:

| | |
|---|---|
| Time-of-day-for-first-shot switches 191 | EECO-6-177606 |
| Comparator 192 and number-of-shots comparator 195 | DM 7485 |
| Adder 194 | DM 7483 |
| Shot-interval switches 193 and number-of-shots-switches 196 | EECO 3-177606 |

Figure 17:
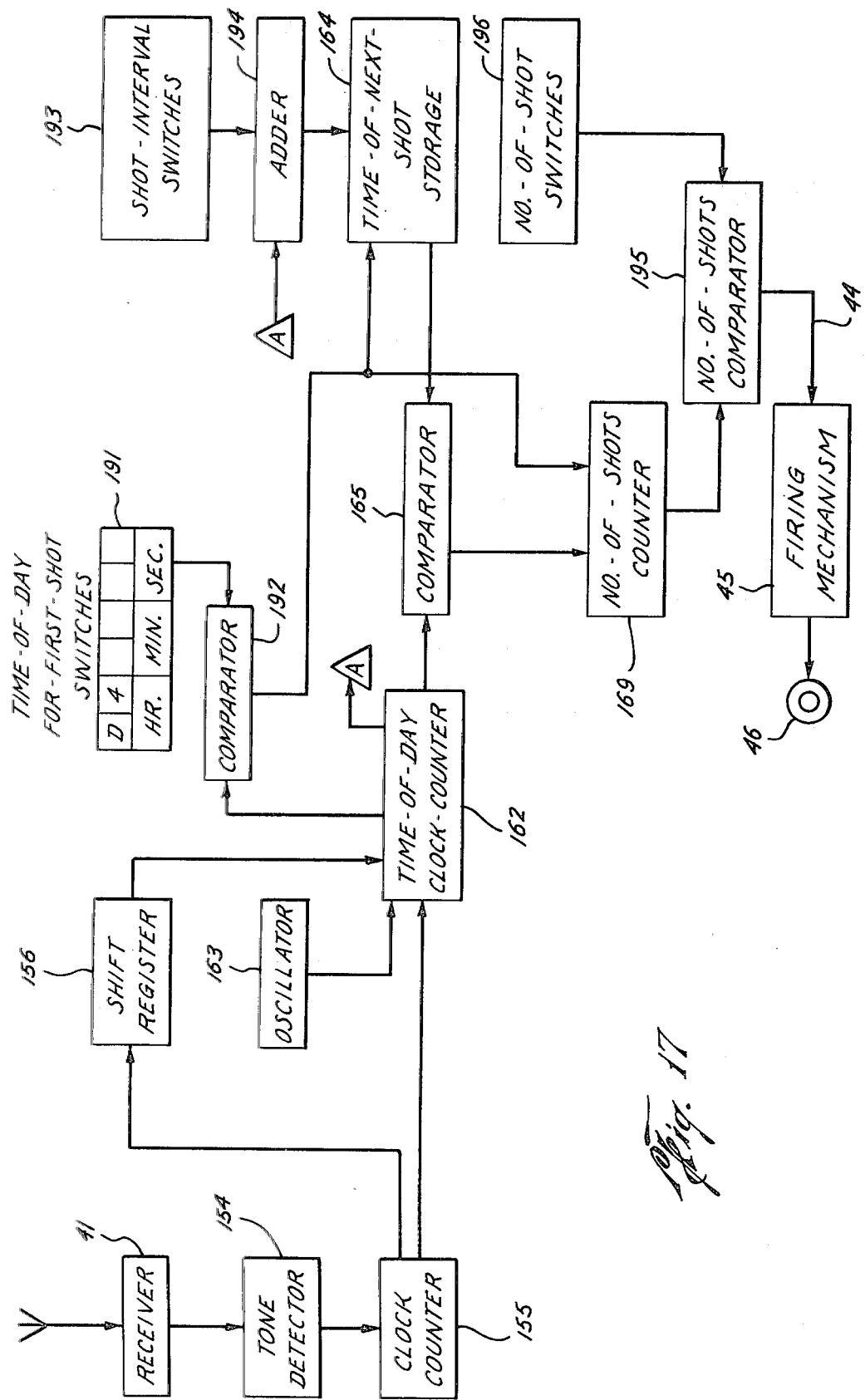
FIG. 17 is a block diagram of the electrical components of the preferred seismic energy source in this third embodiment of the invention.

The preferred seismic energy source 12 in this third embodiment of the invention is illustrated in FIG. 17. Preferably the seismic energy source 12 includes a receiver 41, a firing mechanism 45 and an energy means 46, such as have been described with respect to the seismic energy source 12 illustrated in FIG. 4. The remainder of the preferred components of the seismic energy source are illustrated in FIG. 13 and will now be described.

Preferably the output of the receiver 41 is supplied to the input of a tone detector 154 which functions to transduce the electrical signal supplied to its input into a digital signal representative thereof. The tone detector 154 may comprise tone detectors 47 and 48 and latch circuitry such as have been previously described with respect to FIG. 5. The output of the tone detector 154 preferable is supplied to the input of a clock-counter 155 which functions to count the bits in the digital signal to insure that the message length and the rate of message is correct. The entire digital signal is coupled from the clock-counter 155 into a shift register 156 and temporarily stored therein. When the clock-counter 155 determines that the message length and the rate of message were correctly received, it generates an enabling electrical signal to the time-of-day-clock-counter 162 which enables the time-of-day-clock-counter 162 to receive the digital signals stored in the shift register 156. In this third embodiment of the invention, the message component of the digital signal stored in the shift register 156 will be the selected time-of-day. Once the selected time-of-day is stored in the time-of-day-clock-counter, the crystal oscillator 163 maintains such time-of-day current.

Associated with the seismic energy source are switches 191 for inputting data representative of the selected future time-of-day for the first shot. The data input through such switches is compared by comparator 192 with the current time-of-day data generated by the time-of-day-clock-counter 162. When the comparator 192 determines that the data stored in the switches equals the current time-of-day, it generates an electrical signal which is supplied to and enables the time-of-shot-storage device 164 and the number-of-shots counter 169.

Also associated with the seismic energy source are switches 193 for inputting data representative of a preselected interval of time between shots. The output of the shot-interval switches 193 is coupled to the input of an adder 194. Also coupled to the adder 194 is the output of the time-of-day-clock-counter 162. The adder 194 functions to add the interval of time stored in the shot-interval switches 193 to the current time-of-day generated by the time-of-day-clock-counter 162. The output of the adder 194 is supplied to the input of the time-of-shot-storage device 164. At the instant the time-of-shot-storage device 164 is enabled by the impulse signal from the comparator 192, the electrical signal supplied thereto by the adder 194 (representing the current time-of-day plus the preselected interval of time between shots) is "frozen" in the time-of-shot-storage device 164, and is supplied by the time-of-shot-storage device 164 to the comparator 165. The comparator 165 compares the current time-of-day generated by the time-of-day-clock-counter 162 with the time-of-day stored in the time-of-shot-storage device 164 and, when the two times are equal, generates an enabling electrical signal to the number-of-shots-counter 169.

Also associated with the seismic energy source are switches 196 for inputting data representative of the number of shots which the seismic energy source is to produce. Each time the number-of-shots-counter 169 is enabled, either by an electrical signal from the comparator 192 or the comparator 165, it transmits an electrical signal to the number-of-shots-comparator 195. The number-of-shots-comparator 195 transmits an electrical signal to the firing mechanism 45 each time it receives an enabling signal from the number-of-shots-counter 169 until the number-of-shots produced by the seismic energy source equals the number of shots set in the number-of-shots switches 196. Thereafter, the number-of-shots-comparator 195 will no longer transmit electrical signals to the firing mechanism 45.

In the preferred operation of the third embodiment of the seismic geophysical exploration system according to this invention, the time-of-day-for-first-shot switches 191 associated with the seismic energy source and each of the geophone monitoring means are set to input a selected future instant of time. The shot-interval switches 193 associated with the seismic energy source and the various geophone monitoring means are manipulated to input the selected interval of time between shots. The number-of-shots switches 196 associated with seismic energy source and various geophone monitoring means are manipulated to input the selected number of shots.

The record-length switches 167 associated with the various geophone monitoring means are manipulated to input the interval of time that the record-length counter 166 will remain enabled each time it is enabled.

The control means 16 generates electrical signals synchronizing the internal clocking devices in the seismic energy source and the geophone monitoring means with a selected time-of-day. These electrial signals may be supplied to the seismic energy source and the various geophone monitoring means through conductors. Preferably, however, the electrical signals are transmitted in the form of electromagnetic signals. In such case, the time-of-day switches 121, 122, and 123 and the transmit time-of-day switch 130 in the control means are manipulated to cause the control means to transmit an electromagnetic signal containing data indicative of a selected time-of-day. This electromagnetic signal synchronizes the time-of-day-clock-counter 162 in the seismic energy source and in each of the geophone monitoring means. Preferably this electromagnetic signal is generated by the control means prior to the seismic energy source and the various geophone monitoring means being moved outside of the range of superior radio communication.

When each geophone monitoring means is implaced in position, the location of the geophone monitoring means is input by manipulating the location switches 171.

Thereafter, the seismic energy source produces a shot when the current time-of-day generated by the time-of-day-counter 162 equals the selected time-of-day for the first shot stored in the time-of-day-for-first-shot switches 191. Thereafter the seismic energy sources produces another shot at the selected interval of time set in the shot-interval switches 192. The seismic energy source continues to produce shots at the selected interval of time until the preselected number of shots set in the number-of-shots switches 196 has been produced.

Each of the geophone monitoring means commences receiving, sampling and storing the electrical signals generated by the geophones responsive to the first shot when the current time-of-day generated by the time-of-day-clock-counter 162 equals the selected time-of-day for the first shot stored in the time-of-day-for-first-shot switches 191. Each geophone monitoring means continues to receive, sample and store data for the period of time set in the record-length switches 167. Thereafter, each geophone monitoring means commences receiving, sampling, summing and storing the electrical signals generated by the geophone responsive to a subsequent shot at the selected interval of time set in the shot-interval switches 193. In each case, the geophone monitoring means continues to receive, sample, sum and store the data for the period of time set in the record-length switches 167. Each of the geophone monitoring means continues this operation until data responsive to a preselected number of shots has been summed and stored. When the number of shots counted by the number-of-shots-counter 169 equals the preselected number of shots in the number-of-shots switches 196, the summed data in the memory device 76 is accessed to the recording means 89 and a record is made thereof.

The operator of the system then manually collects the records, tapes or the like from the recording means in the various geophone monitoring means. However, the seismic energy source and the various geophone monitoring means could be constructed such that another series of shots is produced and another record is made on the recording means before the operation of the system is complete and the records are collected. When the records are collected, they are played out sequentially through a mini-computer and put on a standard multi-track tape in a manner that is well known to those skilled in the art. Since the time in which each shot was produced is fully identified, the records may be properly put together in the usual manner in the main computer.

Thus, this third embodiment of the improved seismic geophysical exploration system according to this invention provides a seismic energy source and a plurality of geophone monitoring means each of which is positioned in relative close proximity to and electrically coupled to one or more geophones. A control means generates an electrical signal containing data which initiates the operation of the seismic energy source and the various geophone monitoring means. The electrical signal generated by the control means contains data which synchronizes an internal clocking system in the seismic energy source and in each of the geophone monitoring means to a selected current time-of-day. Thereafter, the seismic energy source and various geophone monitoring means operate in accordance with preselected internal programs, the operation being timed by the synchronized internal clocking devices of the seismic energy source and the various geophone monitoring means. Such internal clocking device in the seismic energy source and each of the geophone monitoring means clocks the operation of the internal components and thus there is no need for the remotely located control means to generate and transmit a continuous, accurate, clocking signal. Since there is no need for future commands to be transmitted via electromagnetic signals from the control means, the seismic energy source and geophone monitoring means may ultimately be located outside the range of good radio communication. Each of the geophone monitoring means receives, samples, sums and stores, and ultimately records, data representative of the returning seismic waves sensed by the associated geophones.

From the foregoing, it will be understood that this invention provides an improved method and apparatus for seismic geophysical exploration. It will now be apparent to those skilled in the art that the foregoing disclosure and description of the invention is illustrative and explanatory thereof, and various changes may be made in the construction of the improved method and apparatus within the scope of the appended claims without departing from the spirit of the invention.

What is claimed is:

1. A seismic system for geophysical exploration, comprising:
   a seismic energy source for producing a shot which generates seismic waves through the earth;
   a plurality of geophones, each of which senses the seismic waves after travel through the earth and generates an electrical signal representative thereof;
   a plurality of geophone monitoring means, each geophone monitoring means being associated with and electrically coupled to at least one of the geophones; and
   a control means for generating electrical signals initiating the operation of the various remotely located geophone monitoring means;
   each of the remote geophone monitoring means including:
      means for sampling the electrical signal generated by the associated geophone responsive to a shot of the seismic energy source and producing data representative thereof,
      a memory means for storing the data accessed thereto, and
      means for summing the data representative of the electrical signal generated by the associated geophone responsive to a particular shot of the seismic energy source, with the data, if any, representative of the electrical signal generated by the associated geophone responsive to a previous shot or shots, and for accessing such summed data to the memory means.

2. A seismic system for geophysical exploration according to claim 1 and including:
a recorder means for receiving the summed data previously stored in the memory means and making a record thereof.

3. A seismic energy system for geophysical exploration according to claim 1 wherein each geophone monitoring means includes a means for producing a clocking signal which clocks the operation of the means for sampling the geophone electrical signal and producing data representative thereof, the memory means, and the summing means.

4. A seismic system for geophysical exploration according to claim 1 wherein:
the control means includes means for generating electromagnetic signals containing data indicative of a selected time-of-day; and
each of the geophone monitoring means includes means for receiving the electromagnetic signals containing data indicative of the selected time-of-day and thereafter generating an electrical signal indicative of the current time-of-day.

5. A seismic system for geophysical exploration, comprising:
at least one signal energy source for producing a shot at a desired location within a survey area, which shot generates seismic waves in the earth;
a plurality of geophones distributed over the survey area for receiving the seismic waves after travel through the earth and transducing such received seismic waves into representative electrical signals;
a plurality of geophone monitoring means, each geophone monitoring means being physically located in relatively close proximity with and electrically coupled to at least one of the geophones;
a control means for generating an electrical signal initiating the operation of the seismic energy souce and the plurality of geophone monitoring means, the control means including means for generating an electrical signal containing data instructing the seismic energy source and/or the plurality of geophone monitoring means to immediately commence a preselected operation;
the seismic energy source including means producing a shot responsive thereto whenever preselected data is contained in the electrical signal generated by the control means;
each of the geophone monitoring means including means for performing a preselected operation whenever preselected data is contained in the electrical signal generated by the control means, the means for performing the preselected operation further including:
means for successively sampling the electrical signal generated by the associated geophone responsive to a shot by the seismic energy source and producing digitized data representative thereof,
a memory means for storing the digitized data accessed thereto, and
means for summing the digitized data produced by the sampling of the electrical signal generated by the associated geophone responsive to a particular shot, with the digitized data, if any, produced by the sampling of the electrical signal generated by the associated geophone responsive to another shot or shots and for accessing the summed digitized data to the memory means, and
a recorder means for receiving the summed digitized data after a desired number of shots have occurred and for making a record of such summed digitized data.

6. A seismic system for geophysical exploration, comprising:
a plurality of geophones;
a plurality of geophone monitoring means, each geophone monitoring means being physically associated in relatively close proximity with and electrically coupled to at least one geophone;
a seismic energy source for producing a shot generating seismic waves;
a control means for generating and transmitting an electromagnetic signal containing time break data instructing the seismic energy source and/or the various geophone monitoring means to immediately commence performing a preselected operation;
the seismic energy source including:
a means for receiving the electromagnetic signal transmitted by the control means;
means for transducing the received electromagnetic signal into a digital data stream representative thereof,
means for determining from the digital data stream the time break data and for producing an electrical signal representative thereof, and
energy means operable responsive to such electrical signal for producing the shot which generates seismic waves;
the geophone monitoring means including:
receiver means for receiving the electromagnetic signal transmitted by the control means,
means for transducing the received electromagnetic signal into a digital data stream representative thereof,
means for determining from the digital data stream the time break data and for generating an electrical signal representative thereof,
means for generating a clocking signal, the operation of such clocking means being enabled by the electrical signal representative of the time break data,
a summing control means operable responsive to the clocking signal for generating an enabling electrical signal,
means for successively sampling, at selected instants of time responsive to the enabling signal generated by the summing control means, the electrical signal generated by the associated geophones responsive to the seismic waves generated by a shot of the seismic energy source and for providing digitized data representative thereof,
memory means for storing such digitized data as may be access thereto,
adder means for receiving the digitized data representative of the sampling of the electrical signal generated by the associated geophones responsive to a particular shot and for summing such digitized data with such additional digitized data as may be accessed thereto representative of the sampling of the electrical signal generated by the associated geophones responsive to a previous shot or shots and previously stored in the memory means, means for accessing the digitized data back and forth between the memory means and the adder means, and a recorder means for making a record of the totally summed digitized data after a selected number of shots have been produced by the seismic energy source and the electrical signals generated by the associated geophones responsive to such shots have been sampled and summed.

7. A seismic system for geophysical exploration, comprising:

at least one seismic energy source for producing a shot at a desired location within a survey area, which shot generates seismic waves through the earth;

a plurality of geophones distributed over the survey area for receiving the seismic waves after travel through the earth and for transducing such received seismic waves into representative electrical signals;

a plurality of geophone monitoring means, each geophone monitoring means being physically located in relative close proximity with and electrically coupled to at least one of the geophones;

a control means for generating and transmitting an electromagnetic signal containing data initiating the operation of the seismic energy source and the plurality of geophone monitoring means, the control means including:

means for generating an electromagnetic signal containing data representative of a selected time-of-day, and means for generating an electromagnetic signal containing data commanding the seismic energy source and/or the plurality of geophone monitoring means to commence a preselected operation at a selected future time-of-day;

the seismic energy source including means for receiving each of such electromagnetic signals and transducing such electromagnetic signal into a digital data stream representative thereof and further including:

means operable responsive to data in the digital data stream indicative of the selected time-of-day, for generating a digital data signal indicative of the current time-of-day, and means operable responsive to data in the digital data stream indicative of a command for the seismic energy source to produce a shot at a selected future time-of-day, and operable responsive to the digital signal indicative of the current time-of-day, for producing a shot at such selected future time-of-day;

each of the geophone monitoring means including means for receiving each of such electromagnetic signals and transducing such electromagnetic signal into a digital data stream and means for performing certain commanded operations responsive to data contained in the digital data stream, the means for performing the commanded operations including:

means operable responsive to data in the data stream indicative of a selected time-of-day, for generating a digital data signal indicative of the current time-of-day, means operable responsive to data the data stream indicative of the command for the geophone monitoring means to commence a certain preselected operation at a selected future time-of-day, for successively sampling the electrical signal generated by the associated geophone responsive to a shot and for producing digitalized data representative thereof, the successive sampling commencing at the selected future time-of-day as determined by the digital signal indicative of the current time-of-day, and a memory means for storing the data accessed thereto, 8. A seismic system for geophysical exploration according to claim 7, wherein each of the geophone monitoring means further includes:

means operable responsive to data in the digital data stream indicative of a command to commence sampling and summing data responsive to a shot at a selected future time-of-day, for summing the digitized data produced by the sampling of the electrical signal generated by the associated geophones responsive to a shot produced at the selected future time-of-day with digitized data produced by the sampling of the electrical signal generated by the associated geophones responsive to a previous shot or shots and for accessing the summed data to the memory, and a recorder means operable responsive to data in the digital data stream indicative of the command to make a record of the summed data commencing at a selected future time-of-day, for receiving the summed digitized data after a desired number of shots have occurred and for making a record of such summed digitized data.

9. A seismic system for geophysical exploration, comprising:

a seismic energy source for producing a shot which generates seismic waves through the earth;

a plurality of geophones for sensing the seismic waves after travel through the earth and generating electrical signals representative thereof;

a plurality of geophone monitoring means, each geophone monitoring means being associated with and electrically coupled to at least one of the geophones; and a control means for generating and transmitting electromagnetic signals containing data representative of at least (a) a selected current time-of-day or (b) instructions for the seismic energy source and/or the various geophone monitoring means to commence a preselected operation at a selected future time-of-day;

the seismic energy source including:

means for receiving the electromagnetic signal transmitted by the control means and for generating a digital signal representative thereof, means for determining from the digital signal the type of message contained therein, a time-of-day-clock-counter for receiving and storing the data indicative of the selected time-of-day whenever such data is contained in the digital signal and for thereafter generating an electrical signal representative of the current time-of-day, a time-of-shot-storage device for receiving and storing the data representative of the time of the next shot whenever such data is contained in the digital signal, a comparator for comparing the current time-of-day data generated by the time-of-day-clock-counter with the selected future time-of-day data stored in the time-of-shot-storage device and generating an impulse electrical signal when such times are equal, energy means operable responsive to such impulse electrical signal for producing the shot which generates seismic waves;

the geophone monitoring means including:

means for receiving the electromagnetic signal transmitted by the control means and for generating a digital signal representative thereof, means for determining from the digital signal the type of message contained therein, means for generating a clocking signal, a time-of-day-clock-counter for receiving and storing the selected time-of-day whenever such data is contained in the digital signal and for thereafter generating an electrical signal representative of the current time-of-day, a time-of-shot-storage device for receiving and storing the data indicative of the time of the next shot whenever such data is contained in the digital signal, a comparator connected to the outputs of the time-of-day-clock-counter and the time-of-shot-storage device for comparing the current time-of-day with the selected future time-of-day and, when such times are equal, for generating an impulse electrical signal, means operable responsive to the clocking signal and to the impulse electrical signal generated by the comparator, for generating an enabling signal, means for successively sampling, at selected instants of time responsive to the enabling signal, the electrical signal generated by the geophones responsive to a shot by the seismic energy source and for providing digitized data representative thereof, a memory means for storing such digitized data as may be accessed thereto, adder means for receiving the digitized data representative of the sampling of the electrical signal generated by the geophones responsive to a particular shot and for summing such digitized data with digitized data representative of the sampling of the electrical signal generated by the geophones responsive to a previous shot or shots and previously stored in the memory means, means for accessing digitized data back and forth between the adder means and the memory means, and a recorder means for making a record of the summed digitized data after a selected number of shots have been generated by the seismic energy source and the responsive geophones signals have been sampled and summed.

10. A seismic system for geophysical exploration, comprising:

a seismic energy source for producing a shot which generates seismic waves through the earth;

a plurality of geophones, each of which senses the seismic waves after travel through the earth and generates an electrical signal representative thereof;

a plurality of geophone monitoring means, each geophone monitoring means being associated with and electrically coupled to at least one of the geophones;

a control means for generating an electrical signal initiating the operation of the various geophone monitoring means, the control means including means for generating an electrical signal containing data indicative of a selected time-of-day;

the seismic energy source including:

means for receiving the electrical signal containing data indicative of the selected time-of-day and thereafter generating an electrical signal indicative of the current time-of-day, and means operable responsive to the current time-of-day signal for producing a shot at each of selected instants of time; and the geophone monitoring means including:

means for receiving the electrical signal containing data indicative of the selected time-of-day and thereafter generating an electrical signal indicative of the current time-of-day, and means for sampling the electrical signal produced by the associated geophone and generating digitized data representative thereof, the sampling and data generating means being operable responsive to the current time-of-day signal to commence a sampling operation at each of the same selected instants of time at which the seismic energy source produces a shot.

11. A seismic system for geophysical exploration according to claim 10, wherein the geophone monitoring means includes:

memory means for receiving and storing the digitized data accessed thereto, means for summing the incoming digitized data generated by the sampling of the electrical signal produced by the associated geophone responsive to a particular shot of the seismic energy source, with the digitized data, if any, previously generated by the sampling of the electrical signal produced by the associated geophone responsive to a previous shot or shots and previously stored in the memory means, and means for accessing digitized data back and forth between the memory means and the summing means.

12. A seismic system for geophysical exploration according to claim 10, wherein the geophone monitoring means includes:

recorder means for making a record of the summed digitized data accessed thereto, and means for determining the number of sampling operations performed by the sampling and data producing means, and means for accessing to the recorder means the summed data stored in the memory means after a selected number of sampling operations has been performed by the sampling and data producing means.

13. A geophone monitoring means designed to be positioned in relatively close physical proximity with and electrically coupled to at least one geophone to receive the electrical signal produced by the geophone responsive to the geophone sensing the seismic waves produced by a shot of a seismic energy source, the geophone monitoring means including:

means for successively sampling the electrical signal generated by the geophone responsive to a shot by the seismic energy source and producing digitized data representative thereof;

memory means for storing the digitized data accessed thereto;

adder means for performing a desired arithmatic operation on the digitized data accessed thereto, the adder means being operable to repetitively sum the digitized data representative of the sampling of the electrical signal generated by the geophone responsive to a particular shot with the digitized data representative of the sampling of the electrical signal generated by the geophone responsive to a previous shot or shots; and means for accessing data back and forth between the memory means and the adder means.

14. A geophone monitoring means according to claim 13, including:

recorder means for receiving and making a record of the summed data after a desired number of shots have been produced by the seismic energy source.

15. A seismic geophysical exploration system including:

at least one seismic energy source for producing a shot at a desired location within a survey area, which shot generates seismic waves through the earth;

a plurality of geophones distributed over the survey area for receiving the seismic waves after travel through the earth and for transducing such received seismic waves into representative electrical signals;

a plurality of geophone monitoring means, each geophone monitoring means being physically located in relatively close proximity with and electrically coupled to at least one of the geophones;

a control means for generating and transmitting an electromagnetic signal containing data initiating the operation of the seismic energy source and the plurality of geophone monitoring means, the seismic energy source and each of the geophone monitoring means including:

means for receiving each of such electromagnetic signals and transducing such electromagnetic signal into a digital data stream representative thereof; and means for determining if the message length and rate of message of the digital data stream are correct and for generating an electrical signal representative of whether such message length and rate of message are correct, whereby the electromagnetic signal initiating the operation of the seismic energy source and the plurality of geophone monitoring means may be generated repetitively.

16. In a system for performing seismic geophysical surveying and which includes a seismic energy source for producing a shot that generates seismic waves at a desired location in a survey area, which system includes a plurality of geophones positioned in the survey area for receiving such seismic waves and for generating electrical signals representative thereof, and which system includes a plurality of geophone monitoring means positioned in the survey area, each geophone monitoring means being associated in relatively close proximity with and electrically coupled to at least one geophone, the improved method of performing seismic geophysical surveying including the steps of:

1. generating an electromagnetic signal commanding the seismic energy source to immediately produce a shot and commanding each of the geophone monitoring means to immediately commence a preselected operation with respect to the electrical signal generated by the associated geophones responsive to such shot;

2. responsive to receipt of the electromagnetic signal by the seismic energy source, the seismic energy source producing a shot which generates seismic waves through the earth;

responsive to receipt of the electromagnetic signal by the various geophone monitoring means, each of the geophone monitoring means performing the preselected operation on the electrical signal generated by the associated geophone responsive to the shot of the seismic energy source, such step of the geophone monitoring means performing the preselected operation on the electrical signals including:

successively sampling the electrical signal generated by the geophone responsive to such shot and producing digitized data representative thereof, and storing such digitized data in a memory means;

3. generating an electromagnetic signal instructing the seismic energy source to immediately produce another shot and commanding each of the geophone monitoring means to immediately commence a preselected operation with respect to the electrical signal generated by the associated geophone responsive to such shot;

4. responsive to receipt of the electromagnetic signal generated in step (3) by the seismic energy source, the seismic energy source producing another shot which generates seismic waves through the earth;

responsive to receipt of the electromagnetic signal generated in step (3) by the various geophone monitoring means, each of the geophone monitoring means performing the preselected operation on the electrical signal generated by the associated geophone responsive to such shot, such step of the geophone monitoring means performing the preselected operation on the electrical signal including:

successively sampling the electrical signal generated by the associated geophone responsive to such shot and producing digitized data representative thereof, withdrawing from the memory means the digitized data stored therein representative of the successively sampled electrical signal generated by the associated geophone responsive to the previous shot or shots and summing thereto the data representative of the successively sampled electrical signal generated by the associated geophone responsive to the instant shot, and accessing the summed data into the memory means; and 5. successively repeating steps (3) and (4) until a desired number of shots have been produced by the seismic energy source and the electrical signals produced by the geophone associated with each geophone monitoring means have been sampled and digitized and summed in the respective geophone monitoring means.

17. In a system for performing seismic geophysical surveying and which includes a seismic energy source for producing a shot that generates seismic waves at a desired location in a survey area, which system includes a plurality of geophones positioned in the survey area for receiving such seismic waves and for generating electrical signals representative thereof, and which system includes a plurality of geophone monitoring means positioned in the survey area, each geophone monitoring means being associated in relatively close proximity with and electrically coupled to at least one geophone, the improved method of performing seismic geophysical surveying, according to claim 16, including the additional step of:

6. in each geophone monitoring means, making a record of the summed data in a recording means contained therein.

18. In a system for performing seismic geophysical surveying, which system includes a seismic energy source for producing a shot that generates seismic waves at a desired location in a survey area, which system includes a plurality of geophones positioned in the survey area for receiving such seismic waves and for generating electrical signals representative thereof, and which system includes a plurality of geophone monitoring means positioned in the survey area, each geophone monitoring means being associated in relative close proximity with and electrically coupled to at least one geophone, the improved method of performing seismic geophysical exploration according to claim 16 and including the additional steps of:

6. generating an electromagnetic signal instructing each of the geophone monitoring means to make a record of such summed digitized data; and 7. responsive to receipt of such electromagnetic signal by the various geophone monitoring means, each of the geophone monitoring means making a record of such summed data.

19. In a system for performing seismic geophysical surveying, which system includes a seismic energy source for producing a shot that generates seismic waves at a desired location in a survey area, which system includes a plurality of geophones positioned in the survey area for receiving such seismic waves and for generating electrical signals representative thereof, and which system includes a plurality of geophone monitoring means positioned in the survey area, each geophone monitoring means being associated in relatively close proximity with and electrically coupled to at least one geophone, the improved method of performing seismic geophysical surveying including the steps of:

1. generating an electromagnetic signal containing data instructing the seismic energy source and each of the geophone monitoring means of a selected time-of-day;

2. responsive to receipt of the electromagnetic signal by the seismic energy source and by the various geophone monitoring means, producing in the seismic energy source and each of the various geophone monitoring means an electrical signal which is indicative of the current time-of-day;

3. generating an electromagnetic signal containing data commanding the seismic energy source to produce a shot at a selected future time-of-day and commanding each of the geophone monitoring means to commence, at such selected future time-of-day, a preselected operation with respect to the electrical signal generated by the associated geophone;

4. responsive to receipt of the electromagnetic signal generated in step (3) by the seismic energy source, producing a shot by the seismic energy source at the selected future time-of-day, the selected future time-of-day being based upon the current time-of-day signal being produced within the seismic energy source;

responsive to receipt of the electromagnetic signal generated in step (3) by the various geophone monitoring means, commencing the performance by each of the geophone monitoring means of the preselected operation on the electrical signal generated by the associated geophone responsive to such shot, the preselected operation being commenced at such selected future time-of-day and the selected future time-of-day being based on the current time-of-day signal being produced within each of the geophone monitoring means, such step of the geophone monitoring means performing the preselected operation on the electrical signal including:

successively sampling the electrical signal generated by the geophone responsive to such shot and producing digitized data representative thereof, and storing such digitized data in a memory means;

5. generating an electromagnetic signal containing data commanding the seismic energy source to produce another shot at another selected future time-of-day and commanding each of the various geophone monitoring means to commence, at such other selected future time-of-day, the performance of a preselected operation on the electrical signal generated by the geophone responsive to such shot;

6. responsive to receipt of the electromagnetic signal generated in step (5) by the seismic energy source, the seismic energy source producing a shot at the selected future time-of-day, the selected future time-of-day being based upon the current time-of-day signal being generated within the seismic energy source;

responsive to receipt of the electromagnetic signal generated in step (5) by the various geophone monitoring means, each of the geophone monitoring means commencing the performance of the preselected operation on the electrical signal generated by the associated geophone responsive to such other shot, the preselected operation being commenced at the selected future time-of-day and the selected future time-of-day being based on the current time-of-day signal being generated within each of the geophone monitoring means, such step of the geophone monitoring means performing the preselected operation on the electrical signal including:

successively sampling the electrical signal generated by the geophone responsive to such shot and producing digitized data representative thereof, withdrawing from the memory means the data stored therein representative of the successively sampled electrical signal generated by the geophone responsive to the previous shot or shots and summing thereto the data representative of the successively sampled electrical signal generated by the geophone responsive to the instant shot, and accessing the summed data into the memory means; and 7. successively repeating steps (5) and (6) until a desired number of shots have been produced and the electrical signals generated by the geophone associated with each geophone monitoring means responsive to such shots have been sampled and transduced into digitized data, and the digitized data has been summed and stored within each respective geophone monitoring means.

20. In a system for performing seismic geophysical surveying, which system includes a seismic energy source for producing a shot that generates seismic waves at a desired location in a survey area, which system includes a plurality of geophones positioned in the survey area for receiving such seismic waves and for generating electrical signals representative thereof, and which system includes a plurality of geophone monitoring means being associated in relatively close proximity with and electrically coupled to at least one geophone, the improved method of performing seismic geophysical surveying, according to claim 19 and including in steps (2), (4) and (5), the additional step of:

determining at the seismic energy source and each of the various geophone monitoring means if the message length and rate of message of the electromagnetic signal are correct and generating an electrical signal indicative of whether such message length and rate of message are correct, such electrical signal enabling the seismic energy source and each of the various geophone monitoring means to perform the preselected operation commanded by the electromagnetic signal only if the message length and rate of message thereof are correct.

21. In a system for performing seismic geophysical surveying, which system includes a seismic energy source for producing a shot that generates seismic waves at a desired location in a survey area, which system includes a plurality of geophones positioned in the survey area for receiving such seismic waves and for generating electrical signals representative thereof, and which system includes a plurality of geophone monitoring means being associated in relatively close proximity with and electrically coupled to at least one geophone, the improved method of performing seismic geophysical surveying, according to claim 19, including the additional steps of:

8. generating an electromagnetic signal instructing each of the geophone monitoring means to make a record of such summed and stored digitized data; and 9. responsive to receipt of such electromagnetic signal by the various geophone monitoring means, each of the geophone monitoring means making a record of such summed data.

22. In a system for performing seismic geophysical surveying, which system includes a seismic energy source for producing a shot that generates seismic waves at a desired location in a survey area, which system includes a plurality of geophones positioned in the survey area for receiving such seismic waves and for generating electrical signals representative thereof, and which system includes a plurality of geophone monitoring means positioned in the survey area, each geophone monitoring means being associated in relatively close proximity with and electrically coupled to at least one geophone, the improved method of performing seismic geophysical surveying including the steps of:

generating an electromagnetic signal containing data instructing the seismic energy source and each of the geophone monitoring means of a selected time-of-day;

responsive to receipt of the electromagnetic signal by the seismic energy source and by the various geophone monitoring means, producing in the seismic energy source and each of the various geophone monitoring means an electrical signal which is indicative of the current time-of-day;

responsive to the current time-of-day signal generated therein, the seismic energy source producing a shot at each of selected instants of time until a preselected number of shots has been produced;

responsive to the current time-of-day signal generated therein, each of the geophone monitoring means commencing, at each of the selected instants of time that a shot is produced, to sample the electrical signal produced by the associated geophone responsive to a shot by the seismic energy source and generate digitized data representative thereof, each sampling and data generating operation continuing for a preselected period of time; and responsive to the current time-of-day signal generated therein, each of the geophone monitoring means summing the digitized data generated during each sampling and data generating operation with the digitized data generated during the previous sampling and data generating operation or operations.

23. In a system for performing seismic geophysical surveying, which system includes a seismic energy source for producing a shot that generates seismic waves at a desired location in a survey area, which system includes a plurality of geophones positioned in the survey area for receiving such seismic waves and for generating electrical signals representative thereof, and which system includes a plurality of geophone monitoring means positioned in the survey area, each geophone monitoring means being associated in relatively close proximity with and electrically coupled to at least one geophone, the improved method of performing seismic geophysical surveying according to claim 22, and including the additional step of:

responsive to the current time-of-day signal generated therein, each of the geophone monitoring means making a record of the summed digitized data stored therein.

* * * * *